(12) United States Patent
Inoue

(10) Patent No.: US 9,894,343 B2
(45) Date of Patent: Feb. 13, 2018

(54) IMAGE PROCESSING METHOD, IMAGE PROCESSING APPARATUS, IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 14/686,031

(22) Filed: Apr. 14, 2015

(65) Prior Publication Data
US 2015/0304633 A1 Oct. 22, 2015

(30) Foreign Application Priority Data
Apr. 18, 2014 (JP) .................... 2014-086379

(51) Int. Cl.
| | | |
|---|---|---|
| H04N 7/18 | (2006.01) | |
| H04N 13/02 | (2006.01) | |
| G06T 5/00 | (2006.01) | |
| G06T 5/50 | (2006.01) | |
| H04N 13/00 | (2006.01) | |

(52) U.S. Cl.
CPC ......... *H04N 13/0225* (2013.01); *G06T 5/002* (2013.01); *G06T 5/50* (2013.01); *H04N 13/0207* (2013.01); *H04N 13/0217* (2013.01); *H04N 13/0232* (2013.01); *G06T 2200/21* (2013.01); *G06T 2207/10052* (2013.01); *H04N 13/0018* (2013.01); *H04N 2013/0088* (2013.01)

(58) Field of Classification Search
CPC ............................... H04N 13/00; H04N 13/02
USPC ..................................................... 348/42–60
See application file for complete search history.

(56) References Cited

U.S. PATENT DOCUMENTS 7,277,118 B2 * 10/2007 Foote .................... G06T 3/4038
  348/218.1
8,860,829 B2    10/2014 Myokan
(Continued)

FOREIGN PATENT DOCUMENTS

CN     201766676 U    3/2011
CN     102572468 A    7/2012
(Continued)

OTHER PUBLICATIONS

Ng et al., "Light Field Photography with a Hand-held Plenoptic Camera", Stanford Tech Report CTSR Feb. 2005, pp. 1-11.
(Continued)

*Primary Examiner* — Andy Rao
(74) *Attorney, Agent, or Firm* — Rossi, Kimms & McDowell LLP

(57) ABSTRACT

An image processing method includes the steps of determining a first unnecessary component included in each of a plurality of parallax images based on a plurality of pieces of relative difference information of the parallax images (S14, S25, S35, S46), calculating a synthesis value of the first unnecessary components included in the parallax images (S15, S26, S36, S47), and reducing a second unnecessary component included in a synthesis image of the parallax images based on the synthesis value of the first unnecessary components (S17, S28, S38, S50).

18 Claims, 20 Drawing Sheets

(56) References Cited

U.S. PATENT DOCUMENTS

| | | |
|---|---|---|
| 2006/0268104 A1 | 11/2006 | Cowan et al. |
| 2010/0040280 A1 | 2/2010 | McKnight |
| 2012/0321203 A1 | 12/2012 | Yamashita |
| 2013/0162780 A1 | 6/2013 | Kurahashi |
| 2013/0194387 A1 | 8/2013 | Hatakeyama |

FOREIGN PATENT DOCUMENTS

| | | |
|---|---|---|
| CN | 102957844 A | 3/2013 |
| JP | 2008054206 A | 3/2008 |
| JP | 2011205531 A | 10/2011 |
| KR | 1020120072146 A | 7/2012 |
| WO | 2010019922 A1 | 2/2010 |

OTHER PUBLICATIONS

Georgive et al., "Full Resolution Light Field Rendering", Adobe Technical Report Jan. 2008, pp. 1-12.
European Search Report issued in EP Application No. 15001092.4 dated Jul. 7, 2015.
Stanislav Klimenko et al.; "Crosstalk reduction in passive stereo-projection systems", Eurographics 2003, Jan. 1, 2003, XP055084144, Retrieved from the Internet: URL:http://nguyendangbinh.org/Proceedings/Eurographics/2003/dl/conf/eg2003/short/short103.pdf.
Office Action issued in Chinese Appln. No. 201510183988.4 dated Aug. 2, 2017. English translation provided.

\* cited by examiner

IMAGE PROCESSING METHOD, IMAGE PROCESSING APPARATUS, IMAGE PICKUP APPARATUS, AND NON-TRANSITORY COMPUTER-READABLE STORAGE MEDIUM

BACKGROUND OF THE INVENTION

Field of the Invention

The present invention relates to an image processing method for improving an image quality of a shot image.

Description of the Related Art

In image pickup through an image pickup apparatus such as a camera, part of light incident on an image pickup optical system may be reflected by a surface of a lens and a member holding the lens and arrive at an imaging plane as unnecessary light. This unnecessary light appears as an unnecessary component such as a ghost and a flare in a shot image. When a diffractive optical element is used to correct longitudinal (axial) chromatic aberration and chromatic aberration of magnification, light from a high intensity object such as the sun outside an angle of view for the image shooting may be incident on the diffractive optical element, generating unnecessary light as an unnecessary component over the entire image.

Japanese Patent Laid-open No. 2008-54206 discloses a method of detecting any ghost based on a difference image indicating a difference between an image (in-focus image) when an image pickup optical system is in focus on an object and an image (defocus image) when the image pickup optical system is out of focus. However, the method disclosed in Japanese Patent Laid-open No. 2008-54206 requires image pickup to be performed a plurality of times and thus is not suitable for still image pickup and moving image pickup of a moving object.

Japanese Patent Laid-open No. 2011-205531 discloses a method of detecting any ghost based on comparison of a plurality of parallax images captured by a single-lens stereoscopic image pickup. The method disclosed in Japanese Patent Laid-open No. 2011-205531, which obtains a plurality of parallax images by single image pickup, is applicable to still image pickup and moving image pickup of a moving object.

However, the method disclosed in Japanese Patent Laid-open No. 2011-205531 detects any ghost by calculating a difference between a primary image and a secondary image, and thus has a degraded ghost detection effect when using parallax images captured at three viewpoints or more. On the other hand, Japanese Patent Laid-open No. 2011-205531 removes any ghost in each parallax image after a ghost detection, which leads to a complicated processing procedure.

SUMMARY OF THE INVENTION

The present invention provides an image processing method, an image processing apparatus, an image pickup apparatus, and a non-transitory computer-readable storage medium that are capable of reducing any unnecessary component included in a shot image in a simple and effective manner without performing image pickup a plurality of times.

An image processing method as one aspect of the present invention includes the steps of determining a first unnecessary component included in each of a plurality of parallax images based on a plurality of pieces of relative difference information of the parallax images, calculating a synthesis value of the first unnecessary components included in the parallax images, and reducing a second unnecessary component included in a synthesis image of the parallax images based on the synthesis value of the first unnecessary components, and the second unnecessary component is either the synthesis value of the first unnecessary components or a value obtained by multiplying the synthesis value of the first unnecessary components with a weight coefficient.

An image processing apparatus as another aspect of the present invention includes an unnecessary component determiner configured to determine a first unnecessary component included in each of a plurality of parallax images based on a plurality of pieces of relative difference information of the parallax images, an unnecessary component synthesizer configured to calculate a synthesis value of the first unnecessary components included in the parallax images, and an unnecessary component reducer configured to reduce a second unnecessary component included in a synthesis image of the parallax images based on the synthesis value of the first unnecessary components, and the second unnecessary component is either the synthesis value of the first unnecessary components or a value obtained by multiplying the synthesis value of the first unnecessary components with a weight coefficient.

An image pickup apparatus as another aspect of the present invention includes an image pickup element configured to photoelectrically convert an optical image to output a plurality of parallax images, an unnecessary component determiner configured to determine a first unnecessary component included in each of the plurality of parallax images based on a plurality of pieces of relative difference information of the parallax images, an unnecessary component synthesizer configured to calculate a synthesis value of the first unnecessary components included in the parallax images, and an unnecessary component reducer configured to reduce a second unnecessary component included in a synthesis image of the parallax images based on the synthesis value of the first unnecessary components, and the second unnecessary component is either the synthesis value of the first unnecessary components or a value obtained by multiplying the synthesis value of the first unnecessary components with a weight coefficient.

A non-transitory computer-readable storage medium as another aspect of the present invention stores the image processing program configured to cause a computer to execute the steps of determining a first unnecessary component included in each of a plurality of respective parallax images based on a plurality of pieces of relative difference information of the parallax images, calculating a synthesis value of the first unnecessary components included in the parallax images, and reducing a second unnecessary component included in a synthesis image of the parallax images based on the synthesis value of the first unnecessary components, and the second unnecessary component is either the synthesis value of the first unnecessary components or a value obtained by multiplying the synthesis value of the first unnecessary components with a weight coefficient.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

An image pickup apparatus capable of generating a plurality of parallax images used in each embodiment of the present invention includes an image pickup system that guides a plurality of light beams passing through regions of a pupil of an image pickup optical system that are different from each other, to light-receiving portions (pixels) of an image pickup element that are different from each other and perform photoelectric conversions.

Figure 3:
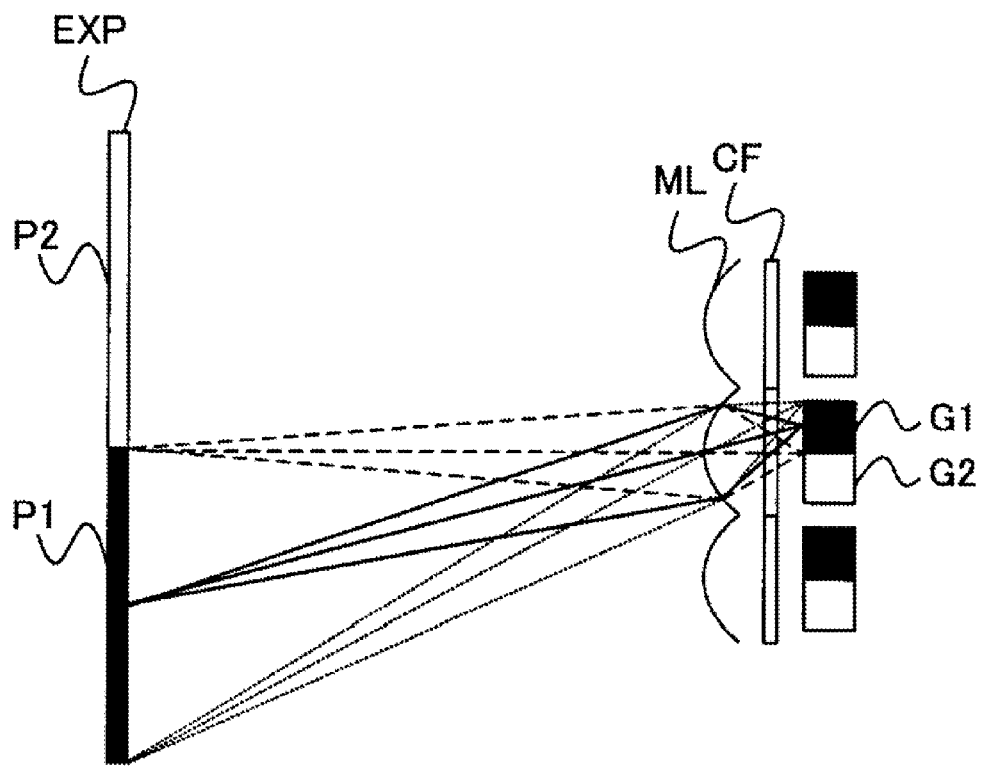
FIG. 3 is a relational diagram illustrating a light-receiving portion of an image pickup element and a pupil of an image pickup optical system in an image pickup system according to each embodiment of the present invention.

FIG. 3 illustrates a relation between the light-receiving portions of the image pickup element in the image pickup system in the present embodiment and the pupil of the image pickup optical system. In FIG. 3, ML represents a micro lens, and CF represents a color filter. EXP represents an exit pupil (the pupil) of the image pickup optical system, and P1 and P2 represent regions of the exit pupil EXP. G1 and G2 represent the pixels (light-receiving portions), and one pixel G1 and one pixel G2 makes a pair (the pixels G1 and G2 are disposed to share one micro lens ML). The image pickup element includes an array of a plurality of pairs (pixel pairs) of the pixels G1 and G2. The paired pixels G1 and G2 have a conjugate relation with the exit pupil EXP with respect to the shared (that is, provided for each pixel pair) micro lens ML. In each embodiment, the pixels G1 and G2 arrayed in the image pickup element are also referred to as pixel units G1 and G2, respectively.

Figure 4:
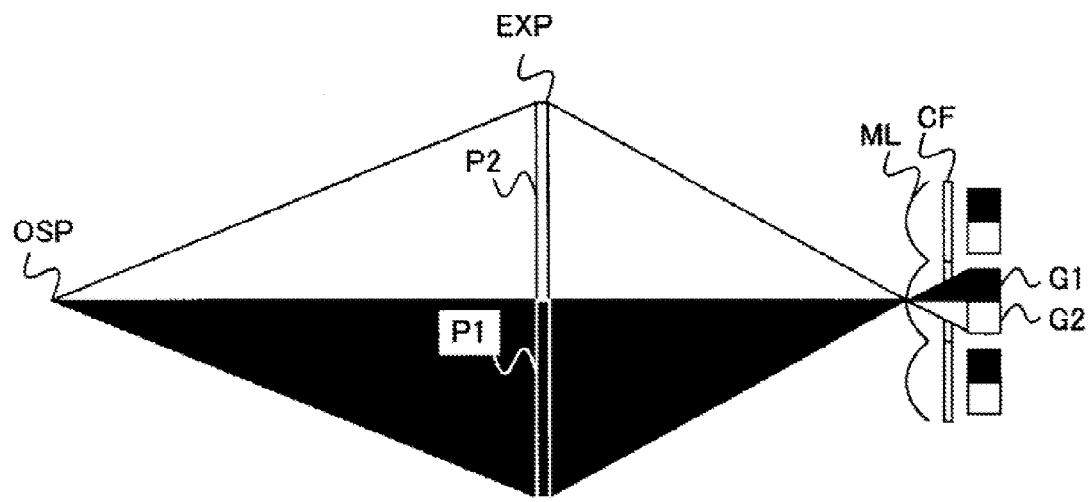
FIG. 4 is a schematic diagram of the image pickup system according to each embodiment.

FIG. 4 is a schematic diagram of the image pickup system in the present embodiment which is assumed to have a configuration in which instead of the micro lens ML illustrated in FIG. 3, a thin lens is provided at the position of the exit pupil EXP. The pixel G1 receives a light beam passing through a region P1 of the exit pupil EXP. The pixel G2 receives a light beam passing through a region P2 of the exit pupil EXP. OSP represents an object point for which image pickup is performed. The object point OSP does not necessarily need to have an object located thereon. A light beam passing through the object point OSP is incident on one of the pixel G1 and the pixel G2 depending on a position (the region P1 or the region P2 in the present embodiment) in the pupil (exit pupil EXP) through which the light beam passes. Travelling of light beams through regions of the pupil that are different from each other corresponds to separation of an incident light from the object point OSP by its angle (parallax). In other words, for each micro lens ML corresponding to the pixels G1 and G2, an image based on an output signal from the pixel G1 and an image based on an output signal from the pixel G2 are generated as a plurality of (in this example, a pair of) parallax images having parallaxes with each other. Hereinafter, reception of light beams passing through the regions of the pupil that are different from each other by the light-receiving portions (pixels) different from each other may be referred to as pupil division.

When the conjugate relation is not completely held due to, for example, a position shift of the exit pupil EXP illustrated in FIGS. 3 and 4, or when the regions P1 and P2 partially overlap with each other, a plurality of obtained images are still treated as parallax images.

[Embodiment 1]

Figure 5:
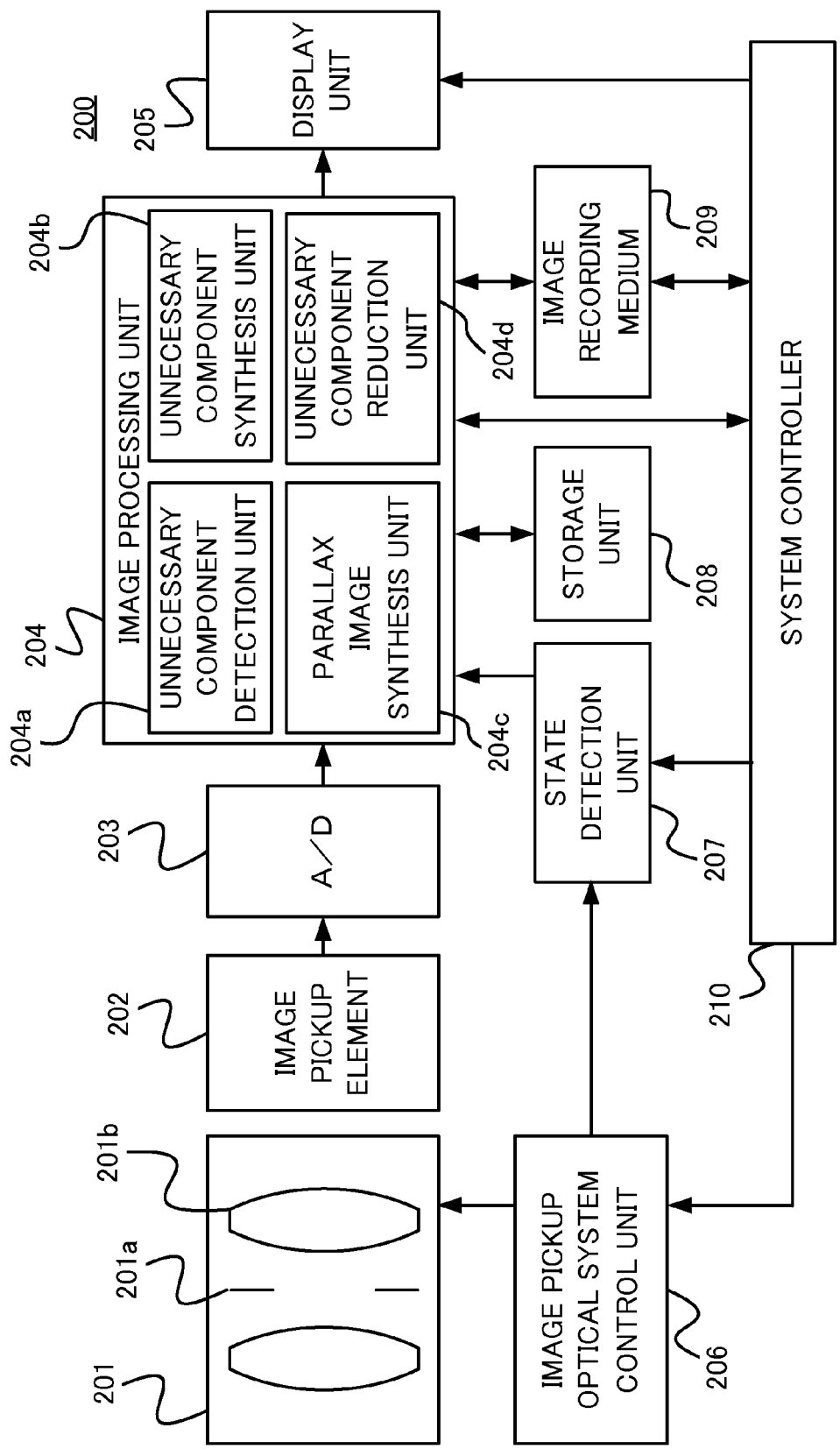
FIG. 5 is a block diagram of an image pickup apparatus according to Embodiment 1.

Referring to FIG. 5, an image pickup apparatus that executes an image processing method according to Embodiment 1 of the present invention will be described. FIG. 5 is a block diagram of a configuration of an image pickup apparatus 200 in the present embodiment. An image pickup optical system 201 includes an aperture stop 201a and a focus lens 201b, and causes light from an object (not illustrated) to be imaged (condensed) on an image pickup element 202. The image pickup element 202 includes a photoelectric conversion element such as a CCD sensor and a CMOS sensor, and receives light beams passing through regions of the pupil that are different from each other, through pixels (light-receiving portions) corresponding to the respective regions (performs the pupil division), as described referring to FIGS. 3 and 4. In this manner, the image pickup element 202 performs a photoelectric conversion on an object image (optical image) and outputs image signals (analog electric signals) as a plurality of parallax images. An A/D converter 203 converts the analog electric signals output from the image pickup element 202 into digital signals, and then outputs these digital signals to an image processing unit 204 (image processor).

The image processing unit 204 performs typical image processing on the digital signals, and also performs determination processing of unnecessary light and correction processing to reduce or remove the unnecessary light. In the present embodiment, the image processing unit 204 corresponds to an image processing apparatus mounted on the image pickup apparatus 200. The image processing unit 204 includes an unnecessary component detection unit 204a, an unnecessary component synthesis unit 204b, a parallax image synthesis unit 204c, and an unnecessary component reduction unit 204d.

The unnecessary component detection unit 204a (an unnecessary component determiner) generates (acquires) parallax images and detects (determines) any unnecessary component (first unnecessary component) in the parallax images. The unnecessary component synthesis unit 204b (an unnecessary component synthesizer) calculates a synthesis value of unnecessary components detected by the unnecessary component detection unit 204a. The parallax image synthesis unit 204c (parallax image synthesizer) synthesizes the parallax images generated by the unnecessary component detection unit 204a. The unnecessary component reduction unit 204d (unnecessary component reducer) reduces any unnecessary component (second unnecessary component) in the parallax images synthesized by the parallax image synthesis unit 204c based on the synthesis value of the unnecessary components that is calculated by the unnecessary component synthesis unit 204b. In the present embodiment, the second unnecessary component is the synthesis value of the first unnecessary components or a value obtained based on the synthesis value of the first unnecessary components.

An output image (image data) processed at the image processing unit 204 is stored in an image recording medium 209 such as a semiconductor memory and an optical disk. The output image from the image processing unit 204 may be displayed on a display unit 205. A storage unit 208 stores an image processing program and various kinds of information needed for the image processing by the image processing unit 204.

A system controller 210 (control unit) controls the operation of the image pickup element 202, the processing at the image processing unit 204, and the image pickup optical system 201 (the aperture stop 201a and the focus lens 201b). An image pickup optical system control unit 206 performs mechanical drive of the aperture stop 201a and the focus lens 201b of the image pickup optical system 201 in response to a control instruction from the system controller 210. The aperture stop 201a has its opening diameter controlled in accordance with a set aperture value (F-number). The focus lens 201b has its position controlled by an autofocus (AF) system and a manual focus mechanism (not illustrated) to perform focusing (focus control) in accordance with an object distance. A state detection unit 207 acquires current image capturing condition information in response to a control instruction from the system controller 210. In the present embodiment, the image pickup optical system 201 is included as part of the image pickup apparatus 200 (integrally with the image pickup apparatus 200) including the image pickup element 202, but is not limited thereto. Like a single-lens reflex camera, the image pickup system may include an interchangeable image pickup optical system (interchangeable lens) detachably attached to an image pickup apparatus body.

Figure 6A:
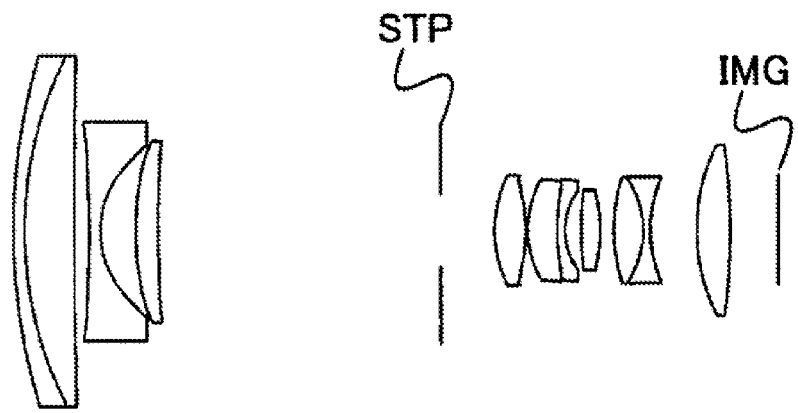
FIG. 6A is a configuration diagram of the image pickup optical system.
Figure 6B:
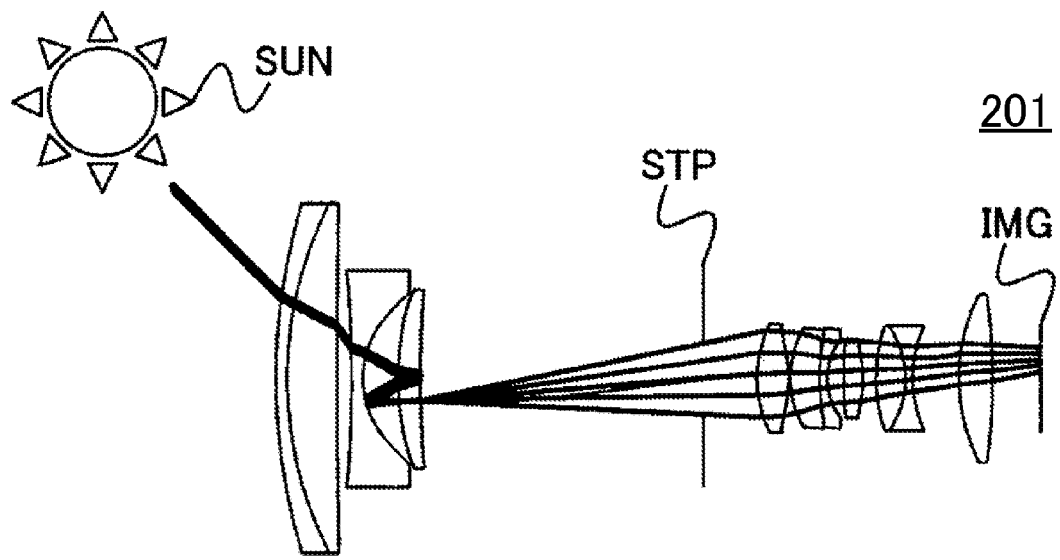
FIG. 6B is an explanatory diagram of unnecessary light occurring in the image pickup optical system according to Embodiment 1.

FIG. 6A illustrates a configuration of the image pickup optical system 201, and FIG. 6B is an explanatory diagram of unnecessary light occurring in the image pickup optical system 201. FIG. 6A specifically illustrates an exemplary configuration of the image pickup optical system 201. In FIG. 6A, STP represents an aperture stop (the aperture stop 201a), and IMG represents an imaging plane. The image pickup element 202 illustrated in FIG. 5 is disposed at the position of the imaging plane IMG. FIG. 6B illustrates a case in which strong light from the sun denoted with SUN as an exemplary high luminance object is incident on the image pickup optical system 201, and light reflected at a surface of a lens included in the image pickup optical system 201 arrives as unnecessary light (ghost and flare) at the imaging plane IMG.

Figure 7:
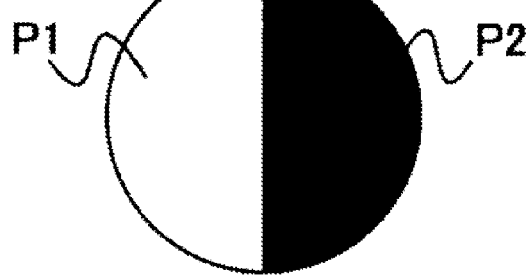
FIG. 7 is an explanatory diagram of unnecessary light travelling through an aperture stop of the image pickup optical system according to Embodiment 1.

FIG. 7 illustrates the regions P1 and P2 (pupil regions or pupil division regions) of the aperture stop STP, through which light beams incident on the pixels G1 and G2 illustrated in FIG. 4 pass. The aperture stop STP can be assumed to correspond to the exit pupil EXP of the image pickup optical system 201, but in practice, it is often the case that the aperture stop STP and the exit pupil EXP are different from each other. Although a light beam from the high luminance object (SUN) passes through an almost entire region of the aperture stop STP, a region through which the light beams to be incident on the pixels G1 and G2 pass divided into the regions P1 and P2 (pupil regions).

Figure 1:
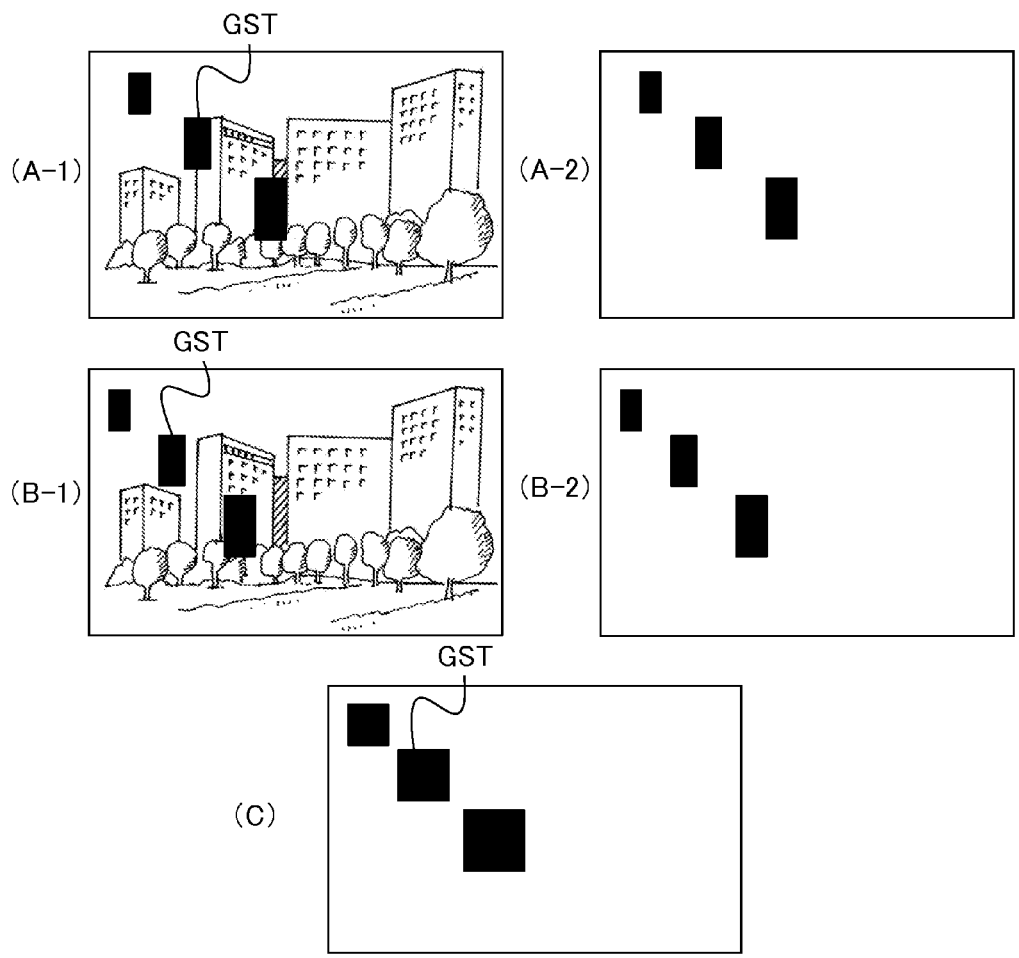
FIG. 1 illustrates a procedure of an image processing method according to Embodiment 1 of the present invention.
Figures 2A, 2B:
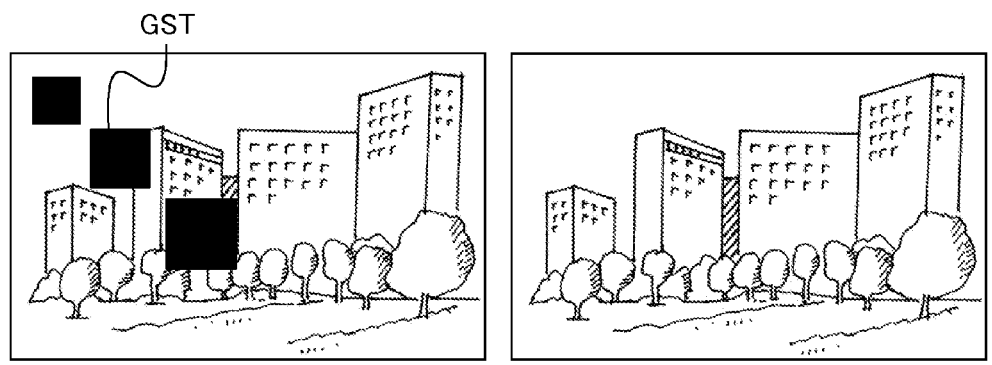
FIGS. 2A and 2B illustrate exemplary output images obtained by the image processing method according to Embodiment 1.

Next, referring to FIGS. 1, 2A, and 2B, a method of determining an unnecessary component as an image component that appears through a photoelectric conversion of unnecessary light in a shot image generated by the image pickup apparatus 200 will be described. FIG. 1 illustrates a procedure of the image processing method according to the present embodiment. FIGS. 2A and 2B illustrate exemplary output images obtained by the image processing method in the present embodiment.

FIG. 2A illustrates a shot image obtained by synthesizing a plurality of parallax images generated through image pickup with the pupil division. This shot image contains objects such as buildings and their surrounding trees. A black rectangle GST illustrated in the shot image of FIG. 2A represents an unnecessary component (ghost component) that is an image component corresponding to unnecessary light (ghost). FIG. 2A illustrates the unnecessary component GST in black, but in reality, they are somewhat transparent enough to see the objects. An unnecessary component corresponds to unnecessary light on a shot object, and thus has luminance higher than that of the shot object. This is true also in other embodiments described later.

FIG. 1 (A-1) and FIG. 1 (B-1) respectively illustrate a pair of parallax images obtained by performing, at the pixel units G1 and G2, a photoelectric conversion on light beams passing through the regions (pupil regions) P1 and P2. A pair of parallax images of a close-range object have a difference (object parallax component) corresponding to their parallax in image components. However, for a long-distance object in a scenery image as illustrated in FIG. 1, the object parallax component is minute. Such a pair of parallax images include an unnecessary component GST schematically illustrated as a black rectangle, whose position differs between the parallax images. Although the positions of the unnecessary components GST illustrated in FIG. 1 do not overlap with each other and are separated from each other, they may overlap with each other but have luminance differences. In other words, the unnecessary components GST represented by black rectangles need to have positions or luminances different from each other.

FIG. 1 (A-2) illustrates an image (relative difference image) obtained by subtracting the image of FIG. 1 (B-1) in the pair of parallax images from the image of FIG. 1 (A-1) in the pair as a reference image. The image (relative difference image) of FIG. 1 (A-2) includes, as a difference (relative difference information) of the pair of parallax images, a parallax component of an object and an unnecessary component thereof, which is described above. However, for the long-distance object in the scenery image as illustrated in FIG. 1, almost any influence of the object parallax component, which is minute, can be ignored. This difference calculation obtains any unnecessary component included in FIG. 1 (B-1) as a negative value, but this negative value is discarded from the image of FIG. 1 (A-2) to simplify unnecessary component reduction processing described later. Thus, the image (relative difference image) of FIG. 1 (A-2) illustrates any unnecessary component included in the image of FIG. 1 (A-1) only.

Similarly, FIG. 1 (B-2) illustrates an image obtained by subtracting the image of FIG. 1 (A-1) in the pair of parallax images from the image of FIG. 1 (B-1) in the pair as a reference image. Similarly to the image of FIG. 1 (A-2), the difference calculation obtains the unnecessary component included in the image of FIG. 1 (A-1) as a negative value, but this negative values is discarded from the image of FIG. 1 (B-2) to simplify the unnecessary component reduction processing described later. Thus, the image (relative difference image) of FIG. 1 (B-2) illustrates the unnecessary component included in FIG. 1 (B-1) only. In this manner, the image processing method in the present embodiment performs the processing to keep only those unnecessary components in the relative difference images (in other words, separates or extracts the unnecessary components) and determines the unnecessary components.

Next, outputting of a shot image as illustrated in FIG. 2A that is obtained by combining (synthesizing) a plurality of parallax images generated through image pickup with the pupil division will be described. Since any unnecessary component is extracted for each parallax image as described above, the amount of the unnecessary component can be reduced by subtracting the unnecessary component from the parallax image. However, to output one image obtained by combining the parallax images, the reduction processing of the unnecessary component needs to be executed for each parallax image, which results in a complicated procedure of the reduction processing. In the present embodiment, simultaneously with the processing of synthesizing the parallax images to produce the output image, the processing of synthesizing unnecessary components in the parallax images is performed in a similar manner. In the present embodiment, the unnecessary components in the parallax images are combined (synthesized) to output, as a final output image, the image obtained by combining (synthesizing) the parallax images. FIG. 1 (C) illustrates the combined (synthesized) unnecessary components. When a combined value (synthesis value) of the parallax images is output as an output image, the amounts of unnecessary components included in the output image are identical to combined values (synthesis values) of corresponding unnecessary components included in the parallax images.

Then, the image processing method in the present embodiment provides an image to be output with correction processing to remove or reduce unnecessary components synthesized as described above. This can generate an image with reduced unnecessary components that is equivalent to a shot image generated through image pickup without the pupil division as illustrated in FIG. 2B.

Figure 8:
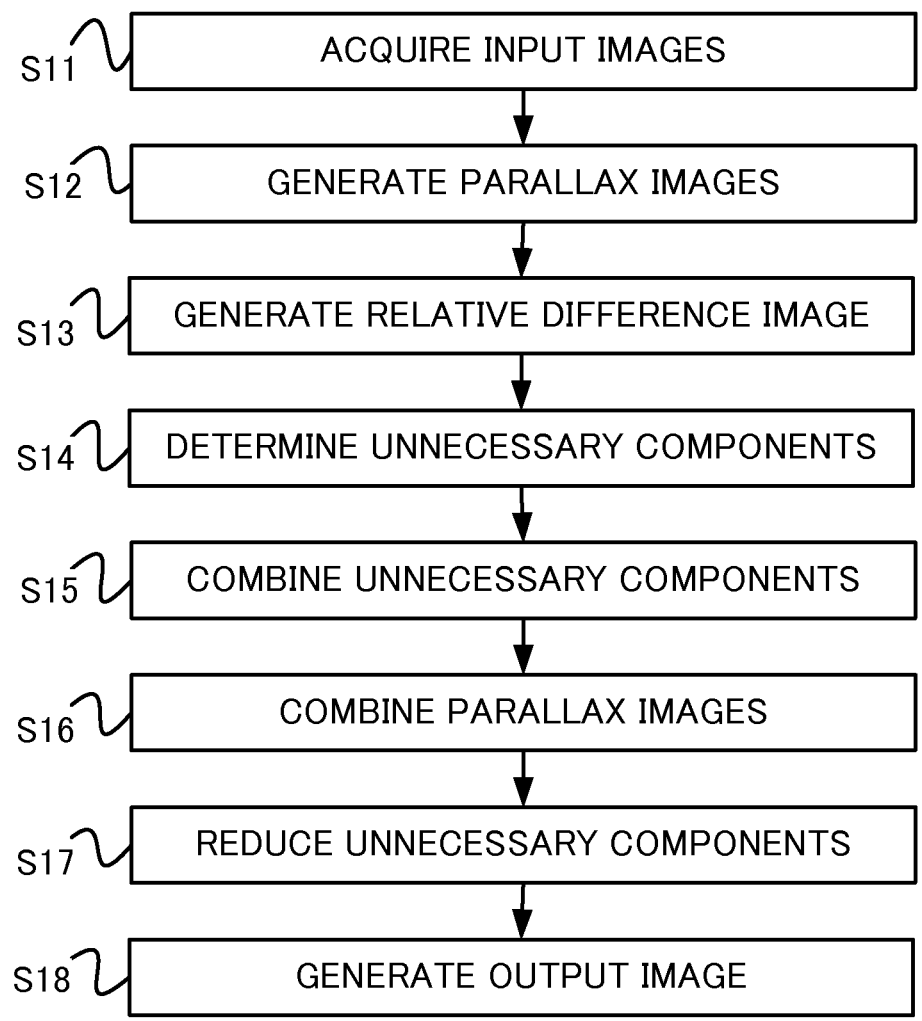
FIG. 8 is a flowchart of the image processing method according to Embodiment 1.

Next, referring to FIG. 8, a procedure of determination processing (image processing) of any unnecessary component (ghost component) in the present embodiment will be described. FIG. 8 illustrates a flowchart of the image processing method (method of determining any unnecessary component) in the present embodiment. Each step in FIG. 8 is executed mainly by the system controller 210 or the image processing unit 204 in accordance with an image processing program as a computer program.

First at step S11, the system controller 210 controls an image pickup unit (the image pickup system) including the image pickup optical system 201 and the image pickup element 202 so as to capture images of an object, and acquires input images (shot images). Then at step S12, the system controller 210 controls the image processing unit 204 to generate a pair of parallax images as the input images by using digital signals that are output from the image pickup element 202 (pixel units G1 and G2) and provided with an A/D conversion by the A/D converter 203. The image processing unit 204 may perform general development processing and various kinds of image correction processing to generate the parallax images.

Subsequently at step S13, the unnecessary component detection unit 204a of the image processing unit 204 calculates relative difference information of the pair of parallax images. In other words, the unnecessary component detection unit 204a generates the relative difference image (image of FIG. 1 (A-2)) based on the image of FIG. 1 (A-1) as a reference image, and the relative difference image (image of FIG. 1 (B-2)) based on the image of and FIG. 1 (B-1) as a reference image. When unnecessary light having arrived at the imaging plane passes through pupil regions of the pupil (exit pupil) of the image pickup optical system 201 that are different from each other, as illustrated in FIG. 1 (A-1) and FIG. 1 (B-1), each unnecessary component is located at positions different from each other between the parallax images. Thus, for a simple relative difference image, a difference value of corresponding unnecessary components is either of positive and negative values. For example, in the present embodiment, subtracting the image of FIG. 1 (B-1) from the image of FIG. 1 (A-1) used as a reference image to generate the relative difference image (image of FIG. 1 (A-2)) yields a positive value for any unnecessary component included in the image of FIG. 1 (A-1). On the other hand, any unnecessary component included in the image of FIG. 1 (B-1) is a negative value.

In the present embodiment, the unnecessary component detection unit 204a performs processing of setting the negative values to zero by discarding them to simplify the unnecessary component reduction processing described later. Thus, in the image of FIG. 1 (A-2), only any unnecessary component included in FIG. 1 (A-1) is detected as a positive value. The unnecessary component detection unit 204a performs the same processing on the relative difference image (image of FIG. 1 (B-2)). Thus, in the image of FIG. 1 (B-2), only any unnecessary component included in the image of FIG. 1 (B-1) is detected as a positive value.

The unnecessary component detection unit 204a may perform the processing of adjusting the positions of a pair of parallax images to remove any object parallax component when calculating relative difference information for images including a close-range object. Specifically, the unnecessary component detection unit 204a determines a shift position at which the images have a maximum correlation, while relatively shifting the position of one of the pair of parallax images relative to the other, thereby adjusting the positions of the images. Alternatively, the unnecessary component detection unit 204a may determine a shift position at which the sum of the squares of differences between the parallax images is at minimum, thereby adjusting the positions of the images. Alternatively, the unnecessary component detection unit 204a may determine the shift position for the position adjustment with respect to in-focus regions in the parallax images.

Alternatively, the unnecessary component detection unit 204a may previously perform an edge detection on each parallax image and determine the shift position for the position adjustment based on an image illustrating a detected edge. This method detects a high contrast edge for an in-focus region, and a low contrast for an out-of-focus region such as the background, which is unlikely to be detected as an edge. The determination of the shift position is necessarily performed based on in-focus regions mainly. The unnecessary component detection unit 204a may additionally perform threshold processing to remove influence of, for example, noise when generating a relative difference image.

Subsequently at step S14, the unnecessary component detection unit 204a determines any component remaining in the relative difference image generated at step S13 as an unnecessary component.

Subsequently at step S15, the unnecessary component synthesis unit 204b of the image processing unit 204 combines any unnecessary component determined for each parallax image at step S14 (calculates a synthesis value of the unnecessary components). Specifically, the unnecessary component synthesis unit 204b adds the relative difference image of FIG. 1 (A-2) and the relative difference image of FIG. 1 (B-2) (calculates a synthesis value of the relative difference images). Consequently, as illustrated in FIG. 1 (C), combined (synthesized) unnecessary components are generated.

Subsequently at step S16, the parallax image synthesis unit 204c combines the parallax images (calculates a synthesis value of the parallax images) and outputs an image equivalent to one shot image generated through image pickup without the pupil division. Specifically, the parallax image synthesis unit 204c adds (synthesizes) a plurality of parallax images (the image of FIG. 1 (A-1) and the image of FIG. 1 (B-1)) generated at step S12 and generates a synthesis image thus combined as illustrated in FIG. 2A. Alternatively, the synthesis image (combined value of the parallax images) may be generated by, without generating the parallax images, adding a digital signal output from the image pickup element 202 (pixel units G1 and G2) and provided with an A/D conversion by the A/D converter 203.

Subsequently at step S17, the unnecessary component reduction unit 204d of the image processing unit 204 performs correction processing to reduce or remove any unnecessary component in an image to be output. Specifically, the unnecessary component reduction unit 204d generates, as the image to be output, an image equivalent to a shot image generated through image pickup without the pupil division, as illustrated in FIG. 2B. In the present embodiment, unnecessary components are detected as positive values only since negative values are set to zero to be discarded at step S13. Thus, the unnecessary component reduction unit 204d simply subtracts the image (combined (synthesized) unnecessary components) of FIG. 1 (C) from the image (synthesis image) of FIG. 2A, thereby removing the unnecessary components. Finally at step S18, the system controller 210 stores the image (output image from which the unnecessary components are removed or reduced) of FIG. 2B in the image recording medium 209, or displays the image on the display unit 205.

The present embodiment can determine any unnecessary component (ghost component) formed by unnecessary light (ghost) by using a plurality of relative difference images based on a plurality of parallax images obtained through one image pickup. Thus, the present embodiment can determine any unnecessary component included in a shot image without performing image pickup a plurality of times. Since negative values are discarded when the relative difference images are generated, the present embodiment can obtain a shot image of a high image quality from which the unnecessary component determined only by the simple difference calculation is excellently removed or reduced. In addition, the present embodiment synthesizes unnecessary components (calculates a synthesis value of the unnecessary components) to generate, as one piece of data, unnecessary components included in a synthesis image of the parallax images. Thus, the unnecessary component reduction processing can be executed by one difference calculation only, and thus can be simplified.

[Embodiment 2]

Next, Embodiment 2 (multiple pupil division) of the present invention will be described. An image pickup apparatus in the present embodiment has the same basic configuration as that of the image pickup apparatus 200 in Embodiment 1 described referring to FIG. 5, and thus a description thereof will be omitted.

Figure 9:
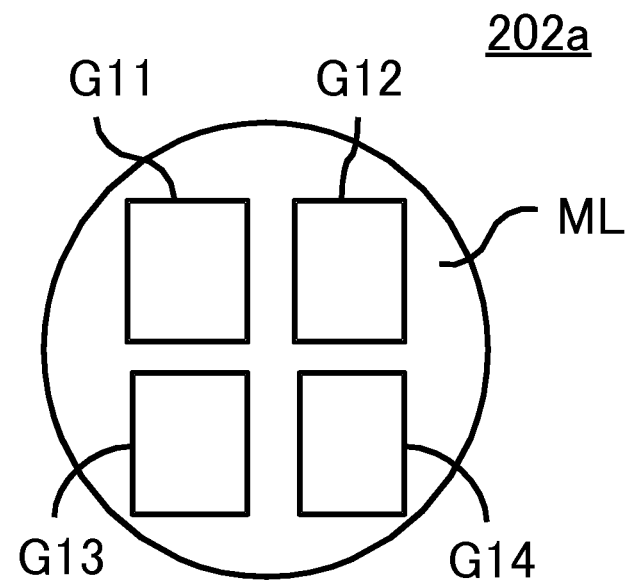
FIG. 9 illustrates an image pickup element according to Embodiment 2.

FIG. 9 illustrates a light-receiving portion of an image pickup element 202a in the present embodiment. In FIG. 9, ML denotes a micro lens. G11, G12, G13, and G14 are a group of pixels (light-receiving portions). The image pickup element 202a includes an array of a plurality of pixel groups each including the pixels G11, G12, G13, and G14, and each pixel group has a conjugate relation with an exit pupil EXP with respect to the micro lens ML that is common or shared (in other words, provided for each pixel group). In the present embodiment, a plurality of pixels G11 arrayed in the image pickup element 202a are collectively referred to as a pixel unit G11. Similarly, sets of a plurality of pixels G12, G13, and G14 arrayed in the image pickup element 202a are collectively referred to as pixel units G12, G13, and G14, respectively. A specific exemplary configuration of the image pickup optical system 201 is the same as that in Embodiment 1 described referring to FIGS. 6A and 6B, and thus a description thereof will be omitted.

Figure 10:
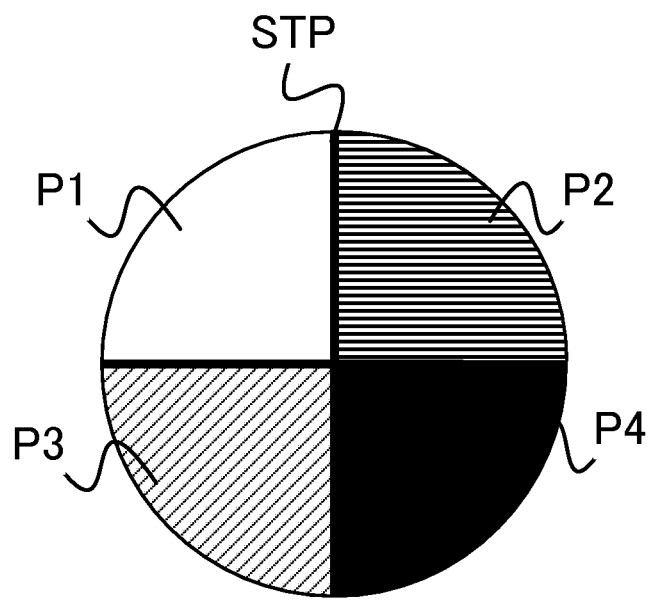
FIG. 10 is an explanatory diagram of unnecessary light travelling through an aperture stop of an image pickup optical system according to Embodiment 2.

FIG. 10 is an explanatory diagram of unnecessary light passing through an aperture stop STP of the image pickup optical system 201. FIG. 10 illustrates regions (pupil regions or pupil division regions) P1, P2, P3, and P4 of the aperture stop STP through which light beams incident on the pixels G11, G12, G13, and G14 illustrated in FIG. 9 pass. The aperture stop STP may be assumed to be equivalent to the exit pupil EXP of the image pickup optical system 201, but in practice, the aperture stop STP and the exit pupil EXP are usually different from each other. Light beams from a high luminance object pass through substantially the entire range of the aperture stop STP, and a region through which the light beams incident on the pixels pass is divided into the regions P1, P2, P3, and P4.

Figure 11A:
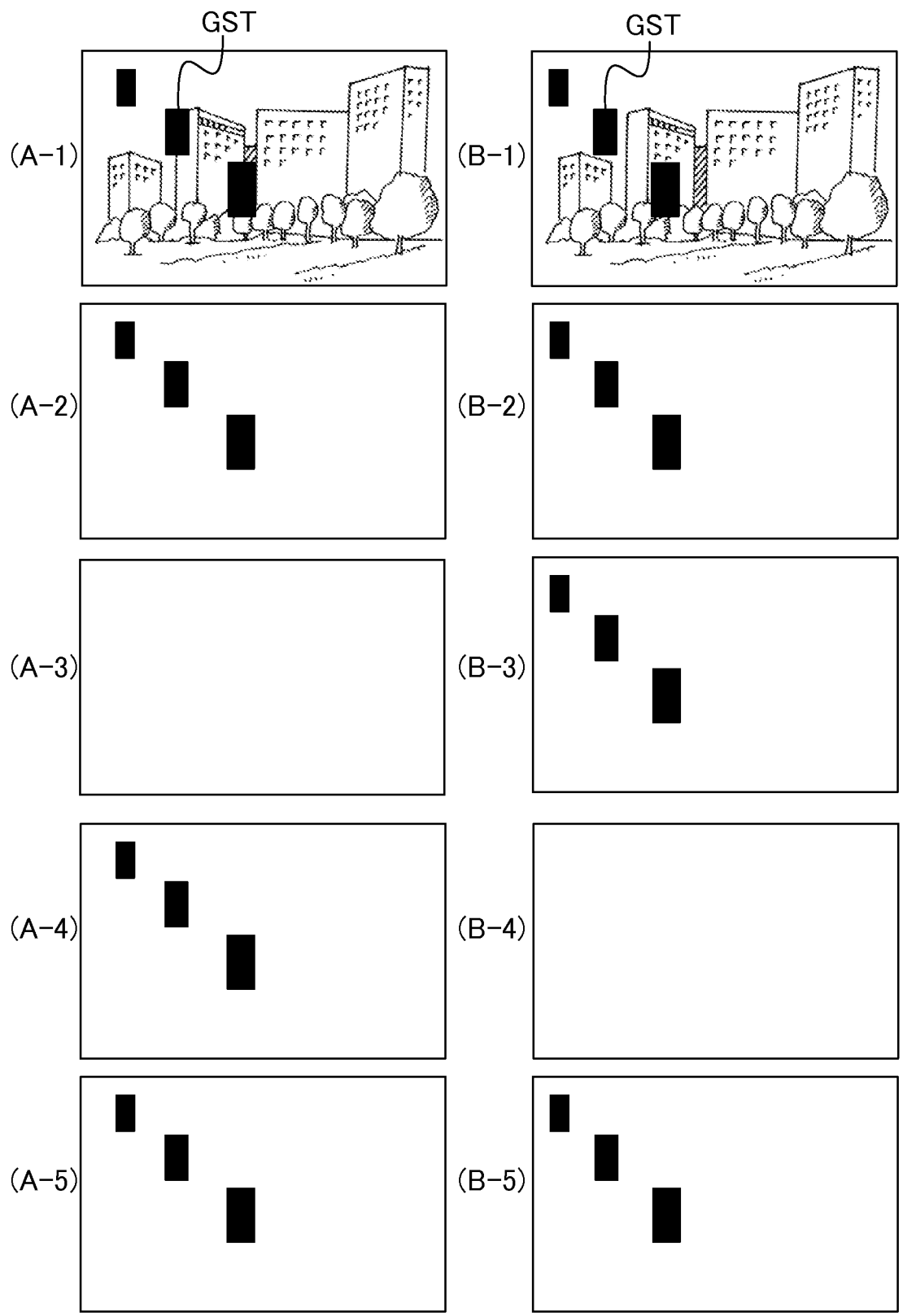
FIG. 11A illustrates a procedure of an image processing method according to Embodiment 2.
Figure 11B:
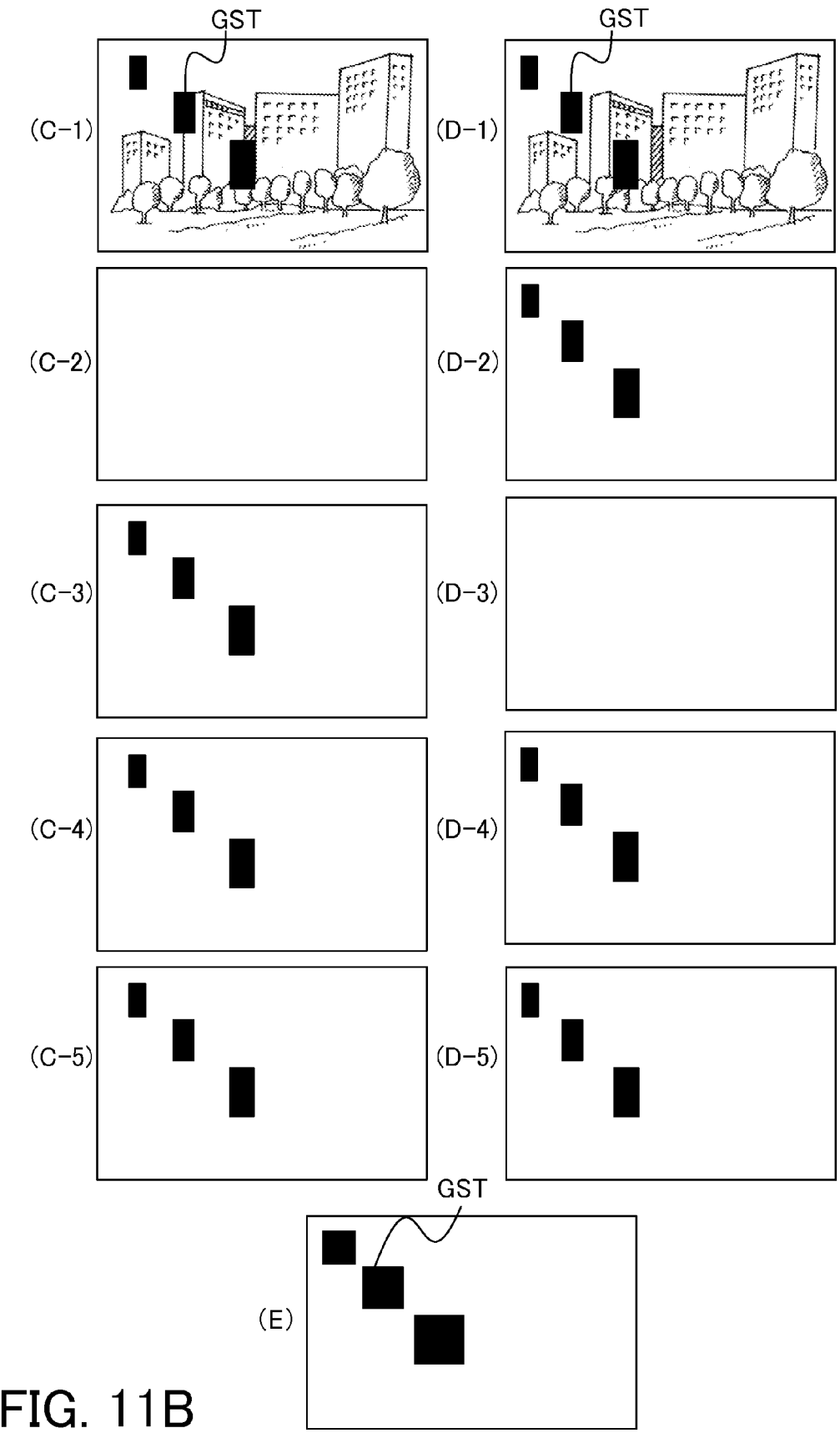
FIG. 11B illustrates the procedure of the image processing method according to Embodiment 2.

Next, referring to FIGS. 11A and 11B, a method of performing a photoelectric conversion on unnecessary light in a shot image acquired (generated) by the image pickup apparatus 200 in the present embodiment so as to determine any unnecessary component (ghost component) in the image will be described. FIGS. 11A and 11B illustrate a procedure of an image processing method in the present embodiment. In the present embodiment, the shot image is an image obtained by synthesizing a plurality of parallax images generated through image pickup with the pupil division, and is the same as the image of FIG. 2A.

FIG. 11A (A-1), FIG. 11A (B-1), FIG. 11B (C-1), and FIG. 11B (D-1) illustrate a set of parallax images obtained by providing light beams passing through the respective regions P1, P2, P3, and P4 with photoelectric conversions at the pixel units G11, G12, G13, and G14. The set of parallax images include an unnecessary component (ghost component) GST schematically illustrated as a black rectangle. The positions of each unnecessary component GST in the image of FIG. 11A (A-1) and the image of FIG. 11B (C-1) overlap with each other. Similarly, the positions of each unnecessary component GST in the image of FIG. 11A (B-1) and the image of FIG. 11B (D-1) overlap with each other. The positions of every unnecessary component GST in the image of FIG. 11A (A-1) and the image of FIG. 11B (D-1) are different from each other. Similarly, the positions of every unnecessary component GST in the image of FIG. 11A (B-1) and the image of FIG. 11B (C-1) are different from each other.

FIG. 11A (A-2) is a relative difference image of a pair of parallax images (difference information of the image of FIG. 11A (A-1) and the image of FIG. 11A (B-1)) that is obtained by subtracting the image of FIG. 11A (B-1) from the image of FIG. 11A (A-1) as a reference image. Similarly to Embodiment 1, this relative difference image includes, as relative difference information, a parallax component of an object and an unnecessary component thereof, which is described above. Similarly to Embodiment 1, the difference calculation obtains any unnecessary component included in FIG. 11A (B-1) as a negative value, but this negative value is discarded from the image of FIG. 11A (A-2) to simplify the unnecessary component reduction processing described later. This is the same for all relative difference images. Thus, the difference image of FIG. 11A (A-2) illustrates any unnecessary component included in the image of FIG. 11A (A-1) only.

FIG. 11A (A-3) is a relative difference image (difference information of the image of FIG. 11A (A-1) and the image of FIG. 11B (C-1)) of a pair of parallax images that is obtained by subtracting the image of FIG. 11B (C-1) from the image of FIG. 11A (A-1) as a reference image. Similarly to Embodiment 1, this relative difference image includes, as relative difference information, a parallax component of an object and an unnecessary component thereof, which is described above. As described above, since the positions of each unnecessary component in the image of FIG. 11A (A-1) and the image of FIG. 11B (C-1) overlap with each other, the unnecessary component is not detected in the relative difference information. In this manner, an unnecessary component present at the same position in the images does not appear in the relative difference image. Thus, there exists an unnecessary component that cannot be detected based on difference information of only two images. On the other hand, when relative difference information of a plurality of parallax images is acquired as in the present embodiment, an effective detection of an unnecessary component included only in one parallax image merely requires the unnecessary component to be at a different position from that in a reference image, as in the image of FIG. 11A (B-1).

FIG. 11A (A-4) is a relative difference image (difference information of the image of FIG. 11A (A-1) and the image of FIG. 11B (D-1)) of a pair of parallax images that is obtained by subtracting the image of FIG. 11B (D-1) from the image of FIG. 11A (A-1) as a reference image. The positions of every unnecessary component in the image of FIG. 11A (A-1) and the image of FIG. 11B (D-1) are different from each other. Thus, similarly to FIG. 11A (A-2), the relative difference image of FIG. 11A (A-4) illustrates any unnecessary component included in the image of FIG. 11A (A-1) only.

The image of FIG. 11A (A-5) is information (relative difference maximum value information or image information) as selection of a maximum value among pieces of relative difference information at each pixel position in the relative difference images of FIG. 11A (A-2), FIG. 11A (A-3), and FIG. 11A (A-4), which is relative difference information acquired as two-dimensional data. In the present embodiment, this image information is information equivalent to that of FIG. 11A (A-2) or FIG. 11A (A-4) and includes the position and amount of each unnecessary component included in FIG. 11A (A-1).

Similarly, FIG. 11A (B-2) is a relative difference image of a pair of parallax images that is obtained by subtracting the image of FIG. 11A (A-1) from the image of FIG. 11A (B-1) as a reference image. FIG. 11A (B-3) is a relative difference image of a pair of parallax images that is obtained by subtracting the image of FIG. 11B (C-1) from the image of FIG. 11A (B-1) as a reference image. FIG. 11A (B-4) is a relative difference image of a pair of parallax images that is obtained by subtracting the image of FIG. 11B (D-1) from the image of FIG. 11A (B-1) as a reference image. The image of FIG. 11A (B-5) is image information (relative difference maximum value information) as selection of a maximum value among the pieces of relative difference information at each pixel position in the relative difference images of FIG. 11A (B-2), FIG. 11A (B-3), and FIG. 11A (B-4) as relative difference information acquired as two-dimensional data. In the present embodiment, this image information is information equivalent to that of FIG. 11A (B-2) or FIG. 11A (B-3) and includes the position and amount of each unnecessary component included in FIG. 11A (B-1).

Similarly, FIG. 11B (C-2) is a relative difference image of a pair of parallax images that is obtained by subtracting the image of FIG. 11A (A-1) from the image of FIG. 11B (C-1) as a reference image. FIG. 11B (C-3) is a relative difference image of a pair of parallax images that is obtained by subtracting the image of FIG. 11A (B-1) from the image of FIG. 11B (C-1) as a reference image. FIG. 11B (C-4) is a relative difference image of a pair of parallax images that is obtained by subtracting the image of FIG. 11B (D-1) from the image of FIG. 11B (C-1) as a reference image. The image of FIG. 11B (C-5) is image information (relative difference maximum value information) as selection of a maximum value among the pieces of relative difference information at each pixel position in the relative difference images of FIG. 11B (C-2), FIG. 11B (C-3), and FIG. 11B (C-4) as relative difference information acquired as two-dimensional data. In the present embodiment, this image information is information equivalent to that of FIG. 11B (C-3) or FIG. 11B (C-4) and includes the position and amount of each unnecessary component included in FIG. 11B (C-1).

Similarly, FIG. 11B (D-2) is a relative difference image of a pair of parallax images that is obtained by subtracting the image of FIG. 11A (A-1) from the image of FIG. 11B (D-1) as a reference image. FIG. 11B (D-3) is a relative difference image of a pair of parallax images that is obtained by subtracting the image of FIG. 11A (B-1) from the image of FIG. 11B (D-1) as a reference image. FIG. 11B (D-4) is a relative difference image of a pair of parallax images that is obtained by subtracting the image of FIG. 11B (C-1) from the image of FIG. 11B (D-1) as a reference image. The image of FIG. 11B (D-5) is image information (relative difference maximum value information) as selection of a maximum value among the pieces of relative difference information at each pixel position in the relative difference images of FIG. 11B (D-2), FIG. 11B (D-3), and FIG. 11B (D-4) as relative difference information acquired as two-dimensional data. In the present embodiment, this image information is information equivalent to that of FIG. 11B (D-2) or FIG. 11B (D-4) and includes the position and amount of each unnecessary component included in FIG. 11B (D-1).

Next, outputting of a shot image obtained by averaging and synthesizing a plurality of parallax images generated through image pickup with the pupil division as illustrated in FIG. 2A will be described. Since any unnecessary component is extracted for each parallax image as described above, the amount of the unnecessary component can be reduced by subtracting the unnecessary component from the parallax image. However, to output one image obtained by averaging the parallax images, the reduction processing of the unnecessary component needs to be executed for each parallax image, which results in a complicated procedure of the reduction processing. In the present embodiment, simultaneously with the processing of synthesizing the parallax images to produce the output image, the processing of synthesizing unnecessary components in the parallax images is performed in a similar manner. In the present embodiment, an average value of unnecessary components in each parallax image is calculated and then the synthesis processing is performed to output, as a final output image, an image obtained by averaging the parallax images. FIG. 11B (E) illustrates averaged and synthesized unnecessary components (image). When an average value of the parallax images is output as an output image, the amounts of unnecessary components included in output image are identical to average values of corresponding unnecessary components included in the parallax images.

Then, the image processing unit 204 provides an image to be output with correction processing to remove or reduce unnecessary components synthesized as described above. This can generate an image with reduced unnecessary components that is equivalent to a shot image generated through image pickup without the pupil division as illustrated in FIG. 2B.

Figure 12:
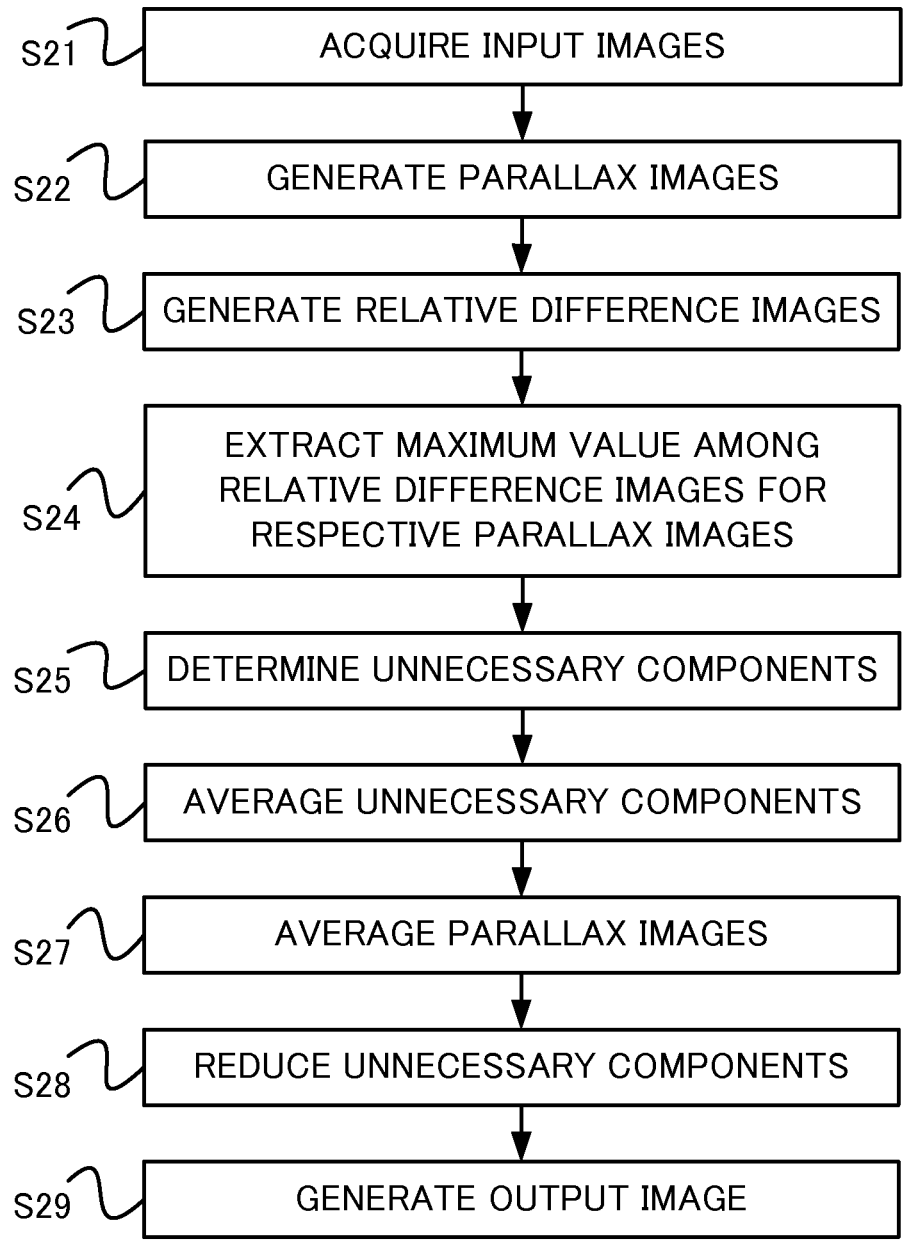
FIG. 12 is a flowchart of the image processing method according to Embodiment 2.

Next, referring to FIG. 12, a procedure of determination processing (image processing) of any unnecessary component (ghost component) in the present embodiment will be described. FIG. 12 illustrates a flowchart of the image processing method (method of determining any unnecessary component) in the present embodiment. Each step in FIG. 12 is executed mainly by the system controller 210 or the image processing unit 204 in accordance with an image processing program as a computer program.

Steps S21 and S22 in FIG. 12 are respectively the same as steps S11 and S12 in FIG. 8 described in Embodiment 1, and thus descriptions thereof will be omitted. Subsequently at step S23, the unnecessary component detection unit 204a calculates a plurality of pieces of relative difference information using each parallax image in a set as a reference image. In other words, the unnecessary component detection unit 204a generates the relative difference images (images of FIG. 11A (A-2), FIG. 11A (A-3), and FIG. 11A (A-4)) based on the image of FIG. 11A (A-1) as a reference image. The unnecessary component detection unit 204a generates the relative difference images (images of FIG. 11A (B-2), FIG. 11A (B-3), and FIG. 11A (B-4)) based on the image of FIG. 11A (B-1) as a reference image. The unnecessary component detection unit 204a generates the relative difference images (images of FIG. 11B (C-2), FIG. 11B (C-3), and FIG. 11B (C-4)) based on the image of FIG. 11B (C-1) as a reference image. The unnecessary component detection unit 204a generates the relative difference images (images of FIG. 11B (D-2), FIG. 11B (D-3), and FIG. 11B (D-4)) based on the image of FIG. 11B (D-1) as a reference image.

When unnecessary light having arrived at the imaging plane passes through pupil regions of the pupil of the image pickup optical system 201 that are different from each other, as illustrated in FIG. 11A (A-1) and FIG. 11A (B-1), each unnecessary component is located at positions different from each other between the parallax images. Thus, for a simple relative difference image, a difference value of corresponding unnecessary components is either of positive and negative values. For example, in the present embodiment, subtracting the image of FIG. 11 (B-1) from the image of FIG. 11 (A-1) used as a reference image to generate the relative difference image (image of FIG. 11A (A-2)) yields a positive value for any unnecessary component included in the image of FIG. 11A (A-1). On the other hand, any unnecessary component included in the image of FIG. 11A (B-1) is a negative value. In the present embodiment, the unnecessary component detection unit 204a performs processing of setting the negative values to zero by discarding them to simplify the unnecessary component reduction processing described later. Thus, in the image of FIG. 11A (A-2), only any unnecessary component included in the image of FIG. 11A (A-1) is detected as a positive value. The unnecessary component detection unit 204a performs same processing on each relative difference image, and only any unnecessary component included in each reference image is detected as a positive value. On the other hand, when the positions of an unnecessary component in the images of FIG. 11A (A-1) and FIG. 11B (C-1) overlap with each other, the unnecessary component is not detected in the relative difference information as described above.

Subsequently at step S24, the unnecessary component detection unit 204a extracts a maximum value among the pieces of relative difference information at each pixel position in the relative difference images obtained using each parallax image generated at step S23 as a reference image. Next, the effect of extracting the maximum value among the pieces of relative difference information will be described. In the present embodiment, the positions of each unnecessary component in the image of FIG. 11A (A-1) and the image of FIG. 11B (C-1) overlap with each other. In this manner, depending on the positions of an optical system and a high luminance light source, the positions of an unnecessary component in parallax images overlap with each other in some cases. In such a case, calculation of a difference between two images yields a zero value for the unnecessary component. Thus, there exists an unnecessary component that cannot be detected based on difference information of only two images. In the present embodiment, relative difference information of a plurality of parallax images is acquired. Thus, an effective detection, as in the image of FIG. 11A (A-2), of any unnecessary component included only in one parallax image merely requires the unnecessary component to be at a different position from that in a reference image, as in the image of FIG. 11A (B-1). As described above, when a plurality of pieces of relative difference information are acquired and relative difference maximum value information of the pieces of relative difference information is extracted, a reliable detection of the position and amount of any unnecessary component included only in one image merely requires the unnecessary component to be at different positions in parallax images.

Then at step S25, the unnecessary component detection unit 204a determines, as unnecessary components, maximum values (remaining components in a relative difference maximum value image, that is, the relative difference maximum value information) extracted at step S24.

Subsequently at step S26, the unnecessary component synthesis unit 204b of the image processing unit 204 averages relative difference maximum value information of unnecessary components in the parallax images, which is determined at step S25. Specifically, the unnecessary component synthesis unit 204b executes an average value calculation of the relative difference maximum value information of FIG. 11A (A-5), FIG. 11A (B-5), FIG. 11B (C-5), and FIG. 11B (D-5), and generates unnecessary components provided with the average value processing as illustrated in FIG. 11B (E).

Subsequently at step S27, the parallax image synthesis unit 204c of the image processing unit 204 averages the parallax images and outputs one image equivalent to a shot image generated through image pickup without the pupil division. Specifically, the parallax image synthesis unit 204c performs an average value calculation (average value processing) on the parallax images of FIG. 11A (A-1), FIG. 11A (B-1), FIG. 11B (C-1), and FIG. 11B (D-1) generated at step S22. As a result, as illustrated in FIG. 2A, a synthesis image provided with the average value processing is generated. Alternatively, the synthesis image may be generated by, without generating the parallax images, calculating average values of digital signals that are output from the image pickup element 202 (pixel units G1 and G2) and provided with A/D conversions by the A/D converter 203.

Subsequently at step S28, the unnecessary component reduction unit 204d of the image processing unit 204 performs correction processing to reduce or remove any unnecessary component in an image to be output. Specifically, the unnecessary component reduction unit 204d generates, as the image to be output, an image equivalent to a shot image generated through image pickup without the pupil division, as illustrated in FIG. 2B. Then, unnecessary components are detected as positive values only since negative values are set to zero to be discarded at step S23. Thus, the unnecessary component reduction unit 204d simply subtracts, from the synthesis image of FIG. 2A, unnecessary components provided with the average value calculation (average value processing) as illustrated in FIG. 11B (E), thereby removing the unnecessary components. Finally at step S29, the system controller 210 stores an output image from which the unnecessary components are removed or reduced as illustrated in FIG. 2B in the image recording medium 209, or displays the output image on the display unit 205.

The present embodiment can determine any unnecessary component (ghost component) formed by unnecessary light (ghost) by using a plurality of relative difference images based on a plurality of parallax images obtained through one image pickup. Thus, the present embodiment can determine any unnecessary component included in a shot image without performing image pickup a plurality of times. Since negative values are discarded when the relative difference images are generated, the present embodiment can obtain a shot image of a high image quality from which the unnecessary component determined only by the simple difference calculation is excellently removed or reduced. The present embodiment calculates a plurality of pieces of relative difference information and calculates relative difference maximum value information as selection of maximum values among them, thereby effectively detecting and reducing any unnecessary component when the positions of the unnecessary component in a plurality of parallax images overlap with each other. In addition, since the present embodiment synthesizes unnecessary components included in an image obtained by synthesizing parallax images so as to generate the unnecessary components as one piece of data, the unnecessary component reduction processing can be executed by one difference calculation only, and thus can be simplified.

[Embodiment 3]

Next, Embodiment 3 of the present invention will be described. An image pickup apparatus in the present embodiment has the same basic configuration as that of the image pickup apparatus 200 in Embodiment 1 described referring to FIG. 5, and thus a description thereof will be omitted. An image pickup element in the present embodiment has the same configuration as that of the image pickup element 202a (the light-receiving portion thereof) in Embodiment 2 described referring to FIG. 9, and thus a description thereof will be omitted. A specific exemplary configuration of an image pickup optical system in the present embodiment is the same as that of the image pickup optical system 201 in Embodiment 1 described referring to FIGS. 6A and 6B, and thus a description thereof will be omitted. In the present embodiment, a relation between an aperture stop STP and regions P1, P2, P3, and P4 (pupil region) through which the light beams incident on pixels G11, G12, G13, and G14 pass is the same as that in Embodiment 2, and thus a description thereof will be omitted.

Figure 13A:
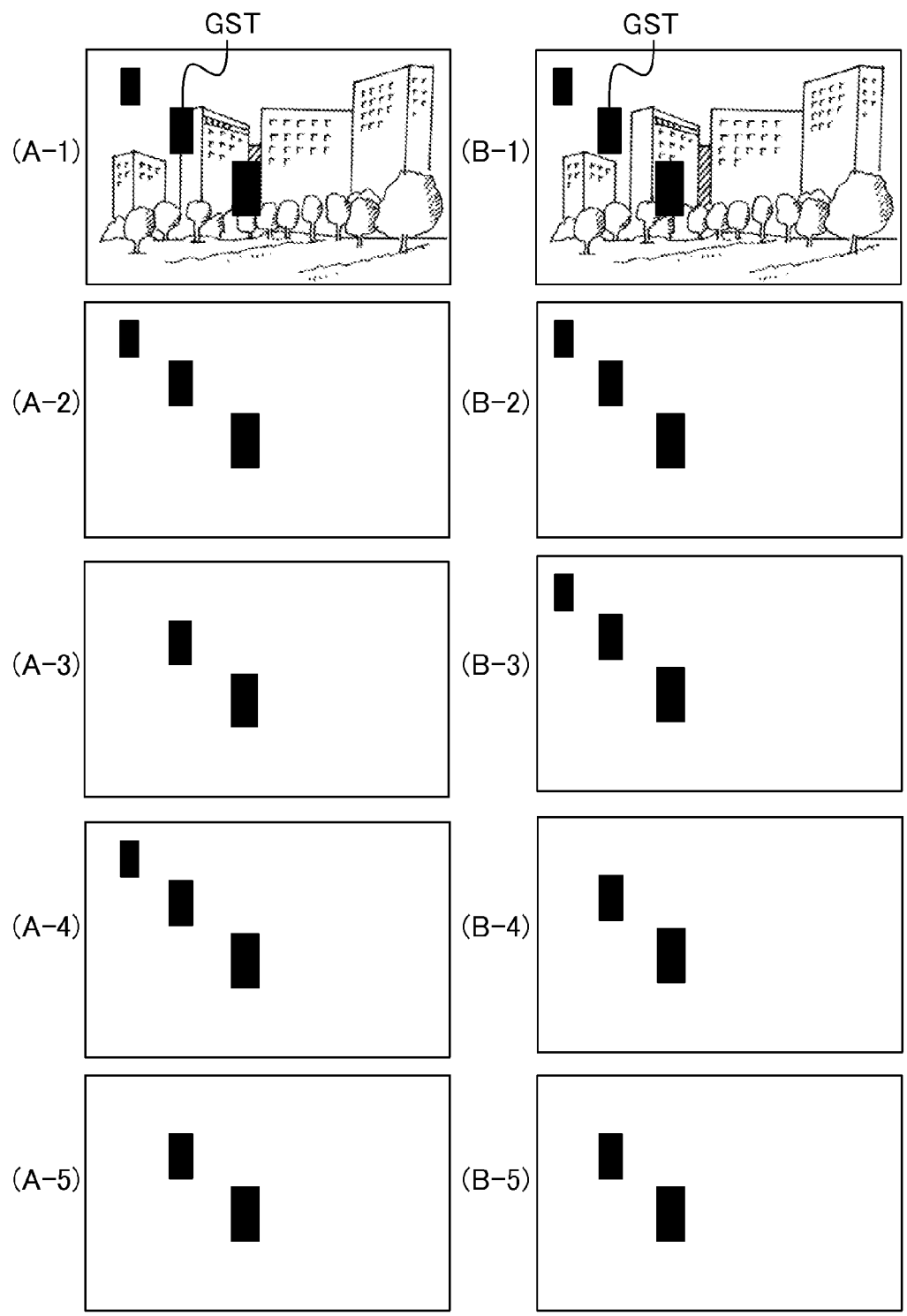
FIG. 13A illustrates a procedure of an image processing method according to Embodiment 3.
Figure 13B:
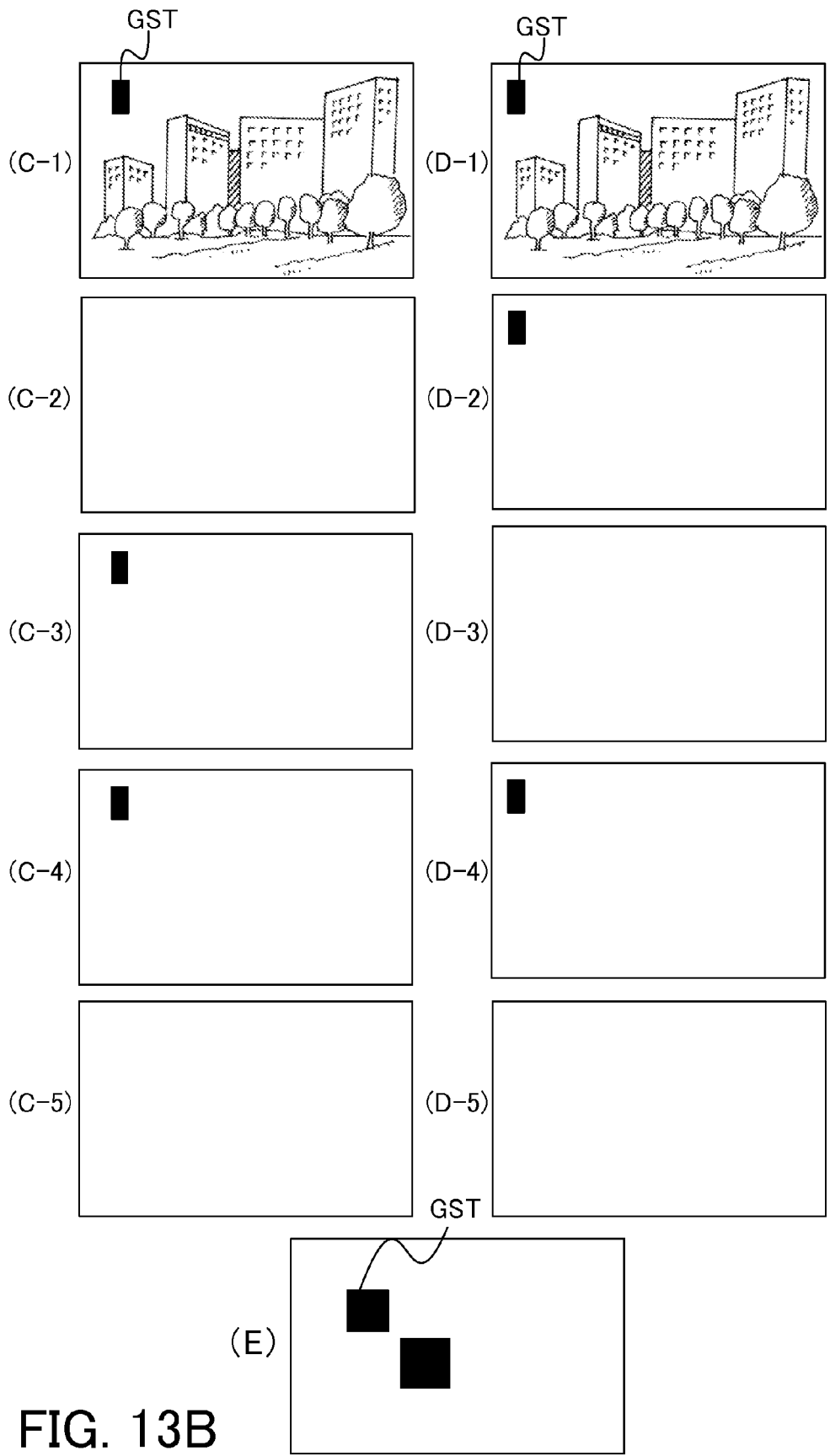
FIG. 13B illustrates the procedure of the image processing method according to Embodiment 3.

Next, referring to FIGS. 13A and 13B, a method of performing a photoelectric conversion on unnecessary light in a shot image acquired (generated) by the image pickup apparatus 200 in the present embodiment so as to determine any unnecessary component (ghost component) in the image will be described. FIGS. 13A and 13B illustrate a procedure of an image processing method in the present embodiment.

FIG. 13A (A-1), FIG. 13A (B-1), FIG. 13B (C-1), and FIG. 13B (D-1) illustrate a set of parallax images obtained by providing light beams passing through the respective regions (pupil regions) P1, P2, P3, and P4 with photoelectric conversions at the pixel units G11, G12, G13, and G14. The set of parallax images includes an unnecessary component GST schematically illustrated as a black rectangle. The positions of an unnecessary component GST in parts (upper-left parts) of FIG. 13A (A-1) and FIG. 13B (C-1) overlap with each other. The positions of an unnecessary component GST in parts (upper-left parts) of FIG. 13A (B-1) and FIG. 13B (D-1) overlap with each other. The positions of every unnecessary component in FIG. 13A (A-1) and FIG. 13A (B-1) are different from each other.

The image of FIG. 13A (A-2) is a relative difference image of a pair of parallax images that is obtained by subtracting the image of FIG. 13A (B-1) from the image of FIG. 13A (A-1) as a reference image. Similarly to Embodiment 1, this relative difference image includes, as relative difference information, a parallax component of an object and an unnecessary component thereof, which is described above. Similarly to Embodiment 1, the difference calculation obtains any unnecessary component included in FIG. 13A (B-1) as a negative value, but this negative value is discarded from the image of FIG. 13A (A-2) to simplify the unnecessary component reduction processing described later. This is the same for all relative difference images described later. Thus, the difference image of FIG. 13A (A-2) illustrates unnecessary components included in FIG. 13A (A-1).

The image of FIG. 13A (A-3) is a relative difference image of a pair of parallax images that is obtained by subtracting the image of FIG. 13B (C-1) from the image of FIG. 13A (A-1) as a reference image. Similarly to Embodiment 1, this relative difference image includes, as relative difference information, a parallax component of an object and an unnecessary component thereof, which is described above. As described above, the positions of the unnecessary component in the part (upper-left part) of the image of FIG. 13A (A-1) and the image of FIG. 13B (C-1) overlap with each other. Thus, the unnecessary component in the upper-left part is not detected in the relative difference information. In this manner, an unnecessary component present at the same position in the images does not appear in the relative difference image.

The image of FIG. 13A (A-4) is a relative difference image of a pair of parallax images that is obtained by subtracting the image of FIG. 13B (D-1) from the image of FIG. 13A (A-1) as a reference image. In the image of FIG. 13A (A-1) and the image of FIG. 13 (D-1), the positions of every unnecessary component are different from each other. Thus, similarly to the image of FIG. 13A (A-2), the image of FIG. 13A (A-4) only illustrates the unnecessary components included in the image of FIG. 13A (A-1).

The image of FIG. 13A (A-5) is image information (relative difference minimum value information or image) as selection of a minimum value among pieces of relative difference information at each pixel position in the relative difference images of FIG. 13A (A-2), FIG. 13A (A-3), and FIG. 13A (A-4), which is relative difference information acquired as two-dimensional data. In the present embodiment, this image information is information equivalent to that of FIG. 13A (A-3) and includes the position and amount of part of the unnecessary components included in FIG. 13A (A-1).

Similarly, the image of FIG. 13A (B-2) is a relative difference image of a pair of parallax images that is obtained by subtracting the image of FIG. 13A (A-1) from the image of FIG. 13A (B-1) as a reference image. The image of FIG. 13A (B-3) is a relative difference image of a pair of parallax images that is obtained by subtracting the image of FIG. 13B (C-1) from the image of FIG. 13A (B-1) as a reference image. The image of FIG. 13B (B-4) is a relative difference image of a pair of parallax images that is obtained by subtracting the image of FIG. 13B (D-1) from the image of FIG. 13A (B-1) as a reference image. The image of FIG. 13A (B-5) is image information as selection of a minimum value among pieces of relative difference information at each pixel position in the relative difference images of FIG. 13A (B-2), FIG. 13A (B-3), and FIG. 13A (B-4), which is relative difference information acquired as two-dimensional data. In the present embodiment, this image information is information equivalent to that of FIG. 13A (B-4) and includes the position and amount of part of the unnecessary components included in FIG. 13A (B-1).

Similarly, the image of FIG. 13B (C-2) is a relative difference image of a pair of parallax images that is obtained by subtracting the image of FIG. 13A (A-1) from the image of FIG. 13B (C-1) as a reference image. The image of FIG. 13B (C-3) is a relative difference image of a pair of parallax images that is obtained by subtracting the image of FIG. 13A (B-1) from the image of FIG. 13B (C-1) as a reference image. The image of FIG. 13B (C-4) is a relative difference image of a pair of parallax images that is obtained by subtracting the image of FIG. 13B (D-1) from the image of FIG. 13B (C-1) as a reference image. The image of FIG. 13B (C-5) is image information as selection of a minimum value among pieces of relative difference information at each pixel position in the relative difference images of FIG. 13B (C-2), FIG. 13B (C-3), and FIG. 13B (C-4), which is relative difference information acquired as two-dimensional data. In the present embodiment, this image information is information equivalent to that of FIG. 13B (C-2), and the position and amount of the unnecessary component included in FIG. 13B (C-1) are not detected.

Similarly, the image of FIG. 13B (D-2) is a relative difference image of a pair of parallax images that is obtained by subtracting the image of FIG. 13A (A-1) from the image of FIG. 13B (D-1) as a reference image. The image of FIG. 13B (D-3) is a relative difference image of a pair of parallax images that is obtained by subtracting the image of FIG. 13A (B-1) from the image of FIG. 13B (D-1) as a reference image. The image of FIG. 13B (D-4) is a relative difference image of a pair of parallax images that is obtained by subtracting the image of FIG. 13B (C-1) from the image of FIG. 13B (D-1) as a reference image. The image of FIG. 13B (D-5) is image information as selection of a minimum value among pieces of relative difference information at each pixel position in the relative difference images of FIG. 13B (D-2), FIG. 13B (D-3), and FIG. 13B (D-4), which is relative difference information acquired as two-dimensional data. In the present embodiment, the image information is information equivalent to that of FIG. 13B (D-3), the position and amount of the unnecessary component included in FIG. 13B (D-1) are not detected.

Next, outputting of a shot image as illustrated in FIG. 2A that is obtained by combining (synthesizing) a plurality of parallax images generated through image pickup with the pupil division will be described. Since any unnecessary component is extracted for each parallax image as described above, the amount of the unnecessary component can be reduced by subtracting the unnecessary component from the parallax image. However, to output one image obtained by combining the parallax images, the reduction processing of the unnecessary component needs to be executed for each parallax image, which results in a complicated procedure of the reduction processing. In the present embodiment, simultaneously with the processing of synthesizing the parallax images to produce the output image, the processing of synthesizing unnecessary components in the parallax images is performed in a similar manner. In the present embodiment, the unnecessary components in the parallax images are combined to output, as a final output image, the image obtained by combining the parallax images. FIG. 13B (E) illustrates the combined (synthesized) unnecessary components.

Then, the image processing unit 204 provides an image to be output with correction processing to remove or reduce unnecessary components synthesized as described above. Thus, any unnecessary component (component illustrated in FIG. 13B (E)) other than overlapped components can be reduced. This can generate an image with reduced amounts of the unnecessary components and equivalent to a shot image generated through image pickup without the pupil division.

Figure 14:
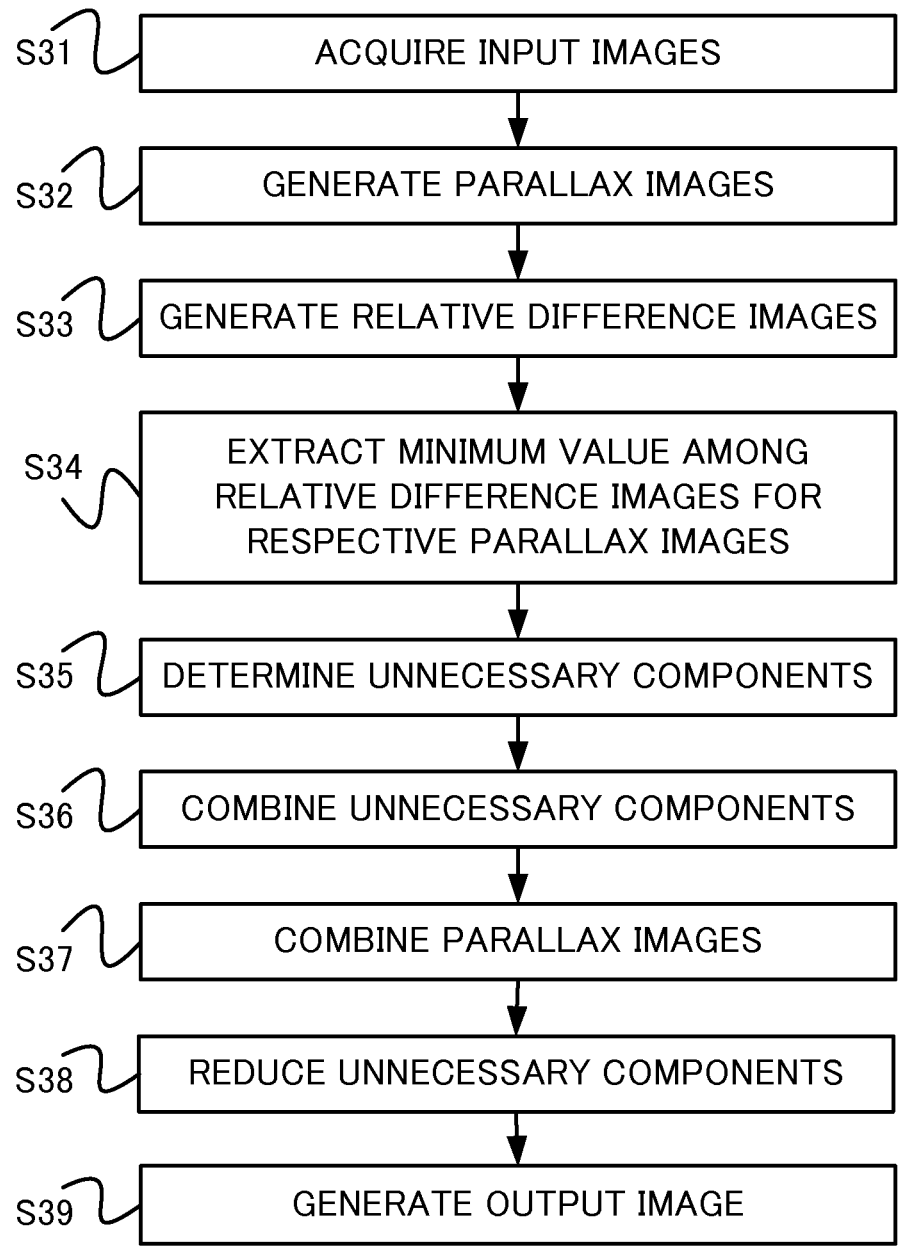
FIG. 14 is a flowchart of the image processing method according to Embodiment 3.

Next, referring to FIG. 14, a procedure of determination processing (image processing) of any unnecessary component (ghost component) in the present embodiment will be described. FIG. 14 illustrates a flowchart of the image processing method (method of determining any unnecessary component) in the present embodiment. Each step in FIG. 14 is executed mainly by the system controller 210 or the image processing unit 204 in accordance with an image processing program as a computer program.

Steps S31 to S33 in FIG. 14 are respectively the same as steps S21 to S23 in FIG. 12 described in Embodiment 2, and thus descriptions thereof will be omitted. Subsequently at step S34, the unnecessary component detection unit 204a of the image processing unit 204 extracts a minimum value among pieces of relative difference information at each pixel position in the relative difference images obtained using each parallax image generated at step S33 as a reference image. Next, the effect of extracting the minimum value among the pieces of relative difference information will be described. In the present embodiment, in the image of FIG. 13A (A-1) and the image of FIG. 13B (C-1), the positions of part of unnecessary components overlap each other. In this manner, depending on the positions of an optical system and a high luminance light source, the positions of an unnecessary component in parallax images overlap with each other in some cases. In such a case, calculation of a difference between two images yields a zero value for the part of unnecessary components. Next, unlike Embodiment 2, the calculation of a minimum value among the pieces of relative difference information can detect an unnecessary component having different positions in all parallax images as illustrated in FIG. 13A and FIG. 13B, but cannot detect an unnecessary component having overlapping positions. This corresponds to detection of an unnecessary component present only in one of a plurality of parallax images. This also corresponds to separation of, from unnecessary components, any object parallax component generated through image pickup of a close-range object and present in three parallax images. In other words, influence of the object parallax component can be largely reduced in the unnecessary component reduction processing on an image of the close-range object. In this manner, a plurality of pieces of relative difference information are acquired and relative difference minimum value information among the pieces of relative difference information is extracted, thereby detecting an unnecessary component other than any unnecessary component having overlapping positions and simultaneously separating any object parallax component for three parallax images.

Subsequently at step S35, the unnecessary component detection unit 204a determines, as unnecessary components, minimum values (remaining components in a relative difference minimum value image, that is, the relative difference minimum value information) extracted at step S34.

Subsequently at step S36, the unnecessary component synthesis unit 204b of the image processing unit 204 combines pieces of relative difference minimum value information as unnecessary components in each parallax image determined at step S35. Specifically, the unnecessary component synthesis unit 204b executes a combined value calculation of the pieces of relative difference minimum value information of FIG. 13A (A-5), FIG. 13A (B-5), FIG. 13B (C-5), and FIG. 13B (D-5), and generates combined unnecessary components as illustrated in FIG. 13B (E).

Subsequently at step S37, the parallax image synthesis unit 204c of the image processing unit 204 combines the parallax images and outputs one image equivalent to a shot image generated through image pickup without the pupil division. Specifically, the parallax image synthesis unit 204c executes a combined value calculation of the parallax images of FIG. 13A (A-1), FIG. 13A (B-1), FIG. 13B (C-1), and FIG. 13B (D-1) generated at step S32, and generates a synthesis image thus combined as illustrated in FIG. 2A. Alternatively, the synthesis image may be generated by, without generating the parallax images, calculating a combined value of digital signals that are output from the image pickup element 202 (pixel units G1 and G2) and provided with A/D conversions by the A/D converter 203.

Subsequently at step S38, the unnecessary component reduction unit 204d of the image processing unit 204 performs correction processing to reduce or remove any unnecessary component in an image to be output. Specifically, the unnecessary component reduction unit 204d generates, as the image to be output, an image equivalent to a shot image generated through image pickup without the pupil division. Then, unnecessary components are detected as positive values only since negative values are set to zero to be discarded at step S33. Thus, the unnecessary component reduction unit 204d simply subtracts, from the synthesis image of FIG. 2A, unnecessary components in FIG. 13B (E) provided with the combined value calculation processing, thereby removing the unnecessary components. Finally at step S39, the system controller 210 stores an output image from which the unnecessary components are removed or reduced in the image recording medium 209, or displays the output image on the display unit 205.

The present embodiment can determine any unnecessary component (ghost component) formed by unnecessary light (ghost) by using a plurality of relative difference images based on a plurality of parallax images obtained through one image pickup. Thus, the present embodiment can determine any unnecessary component included in a shot image without performing image pickup a plurality of times. Since negative values are discarded when the relative difference images are generated, the present embodiment can obtain a shot image of a high image quality from which the unnecessary component determined only by the simple difference calculation is excellently removed or reduced. The present embodiment calculates a plurality of pieces of relative difference information and calculates relative difference minimum value information as selection of minimum values, thereby separating unnecessary components from part of the object parallax component to achieve effective detection and reduction of the unnecessary components. In addition, since the present embodiment synthesizes unnecessary components included in an image obtained by synthesizing parallax images so as to generate the unnecessary components as one piece of data, the unnecessary component reduction processing can be executed by one difference calculation only, and thus can be simplified.

[Embodiment 4]

Next, Embodiment 4 of the present invention will be described. Ren. Ng et al., "Light Field Photography with a Hand-held Plenoptic Camera" (Stanford Tech Report CTSR 2005-2) discloses a "plenoptic camera". The "plenoptic camera" can acquire information of the position and angle of a light beam from an object by using a technique called "light field photography".

Figure 15:
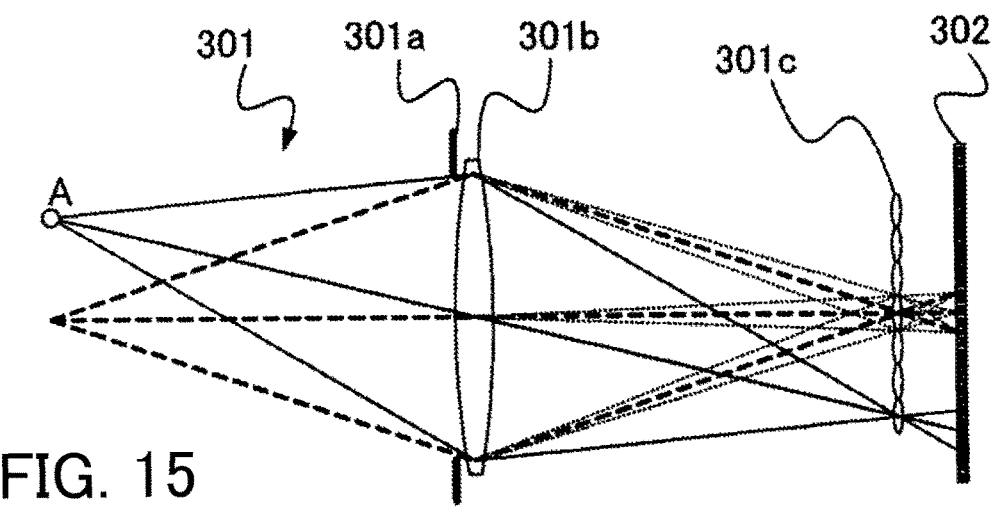
FIG. 15 illustrates an image pickup system according to Embodiment 4.

FIG. 15 illustrates an image pickup system of an image pickup apparatus in the present embodiment, and illustrates a configuration of the image pickup system of the "plenoptic camera". An image pickup optical system 301 includes a primary lens (image pickup lens) 301b and an aperture stop 301a. A micro lens array 301c is disposed at an imaging position of the image pickup optical system 301, and an image pickup element 302 is disposed behind (closer to an image than) the micro lens array 301c. The micro lens array 301c has a function as a separator (separating unit) that prevents a light beam passing through, for example, a point A in an object space from being mixed with a light beam passing through a point near the point A on the image pickup element 302. FIG. 15 illustrates that a top beam, a primary light beam, and a bottom beam from the point A are received by pixels different from each other. Thus, the light beams passing through the point A can be separately acquired depending on their angles.

Figure 16:
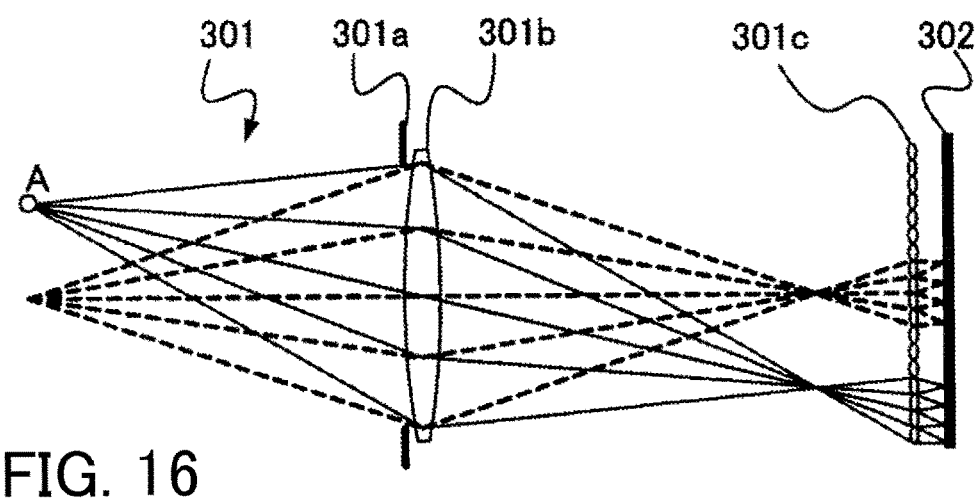
FIG. 16 illustrates the image pickup system according to Embodiment 4.
Figure 17:
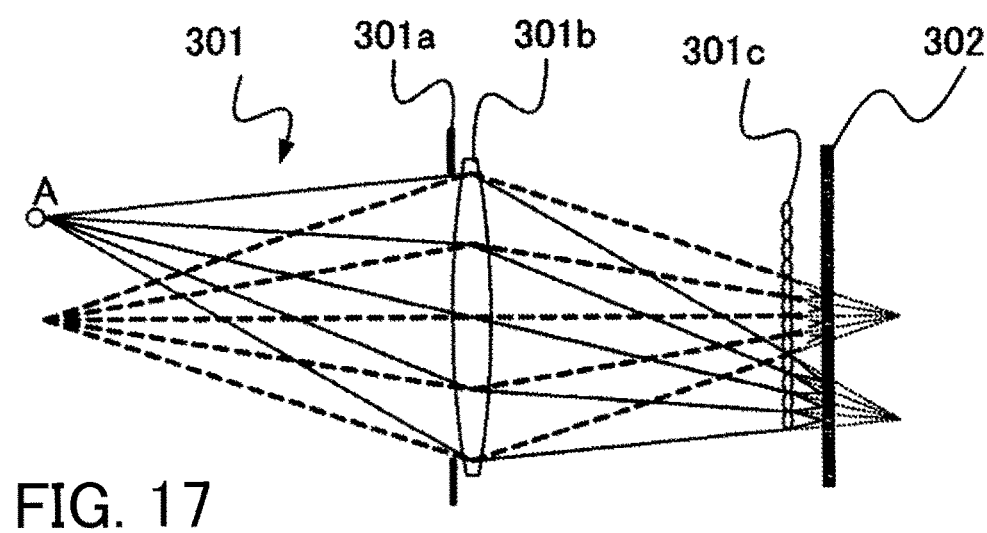
FIG. 17 illustrates the image pickup system according to Embodiment 4.

Todor Georgive et al., "Full Resolution Light Field Rendering" (Adobe Technical Report January 2008) discloses configurations of an image pickup system illustrated in FIGS. 16 and 17 that acquire information (light field) of the position and angle of a light beam.

Figure 18:
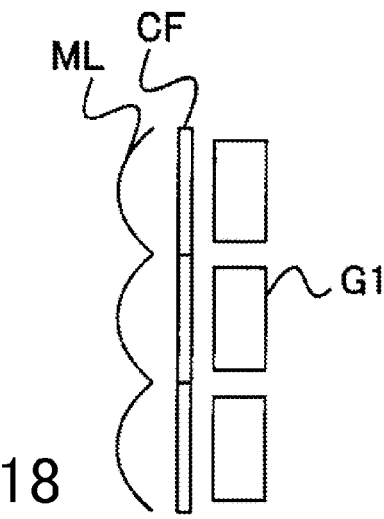
FIG. 18 illustrates a conventional image pickup element.

With the configuration of the image pickup system illustrated in FIG. 16, the micro lens array 301c is disposed behind (closer to an image than) the imaging position of the primary lens 301b to reimage the light beams passing through the point A on the image pickup element 302, thereby separately acquiring the light beams depending on their angles. With the configuration of the image pickup system illustrated in FIG. 17, the micro lens array 301c is disposed in front of (closer to an object than) the imaging position of the primary lens 301b to image the light beams passing through the point A on the image pickup element 302, thereby separately acquiring the light beams depending on their angles. In both configurations, light beams passing through a pupil of the image pickup optical system 301 are separated depending on passed regions (passed positions) in the pupil. In these configurations, the image pickup element 302 may employ a conventional image pickup element including one micro lens ML and one light-receiving portion G1 that are conjugate with respect to a color filter CF as illustrated in FIG. 18.

Figure 19A:
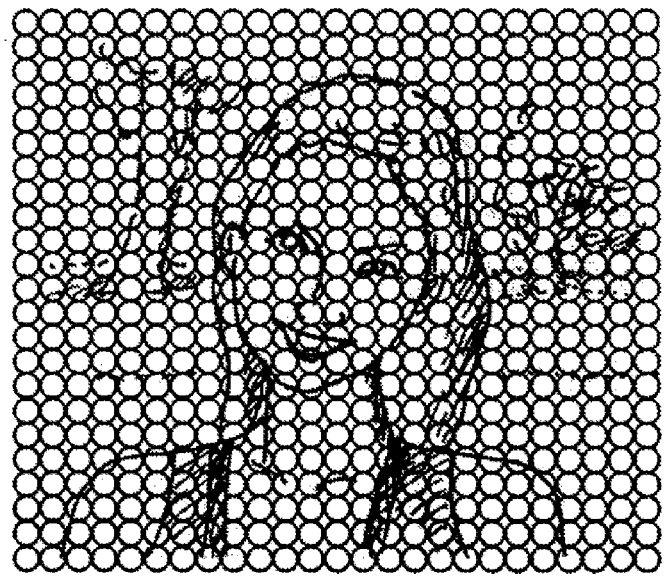
FIGS. 19A and 19B illustrate images obtained through the image pickup system illustrated in FIG. 15.
Figure 19B:
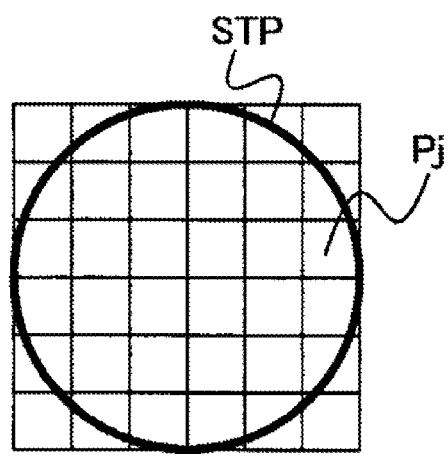
Figure 20:
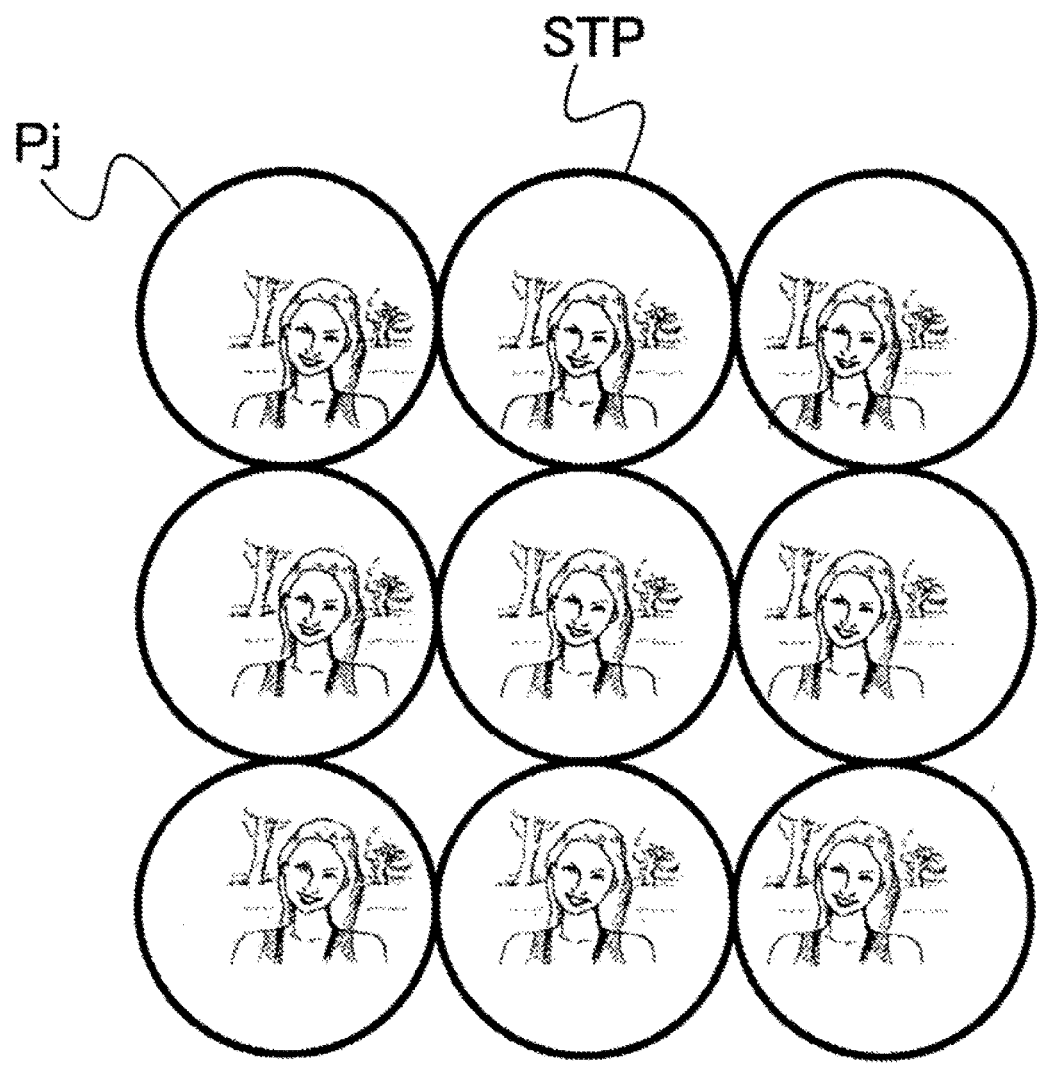
FIG. 20 illustrates an image obtained through the image pickup system illustrated in FIGS. 16 and 17.

The image pickup optical system 301 illustrated in FIG. 15 yields an image as illustrated in FIG. 19A. FIG. 19B is an enlarged view of one of arrayed circles in FIG. 19A. One circle represents the aperture stop STP, and an inside thereof is divided by a plurality of pixels Pj (j=1, 2, 3 . . . ). This configuration allows the intensity distribution of the pupil within one circle to be acquired. The image pickup optical system 301 illustrated in FIGS. 16 and 17 are used to obtain parallax images illustrated in FIG. 20. The parallax images as illustrated in FIG. 20 may be obtained by rearranging and reconstructing the pixels Pj in the circles (aperture stops STP) in an image illustrated in FIG. 19A.

As described in Embodiment 1 to 3, unnecessary light such as ghost passed through the pupil with biased distribution across the pupil. Thus, the image pickup apparatus in the present embodiment that performs image pickup through divided regions of the pupil may employ the image processing methods described in Embodiment 1 to 3 to determine unnecessary components.

Figure 21:
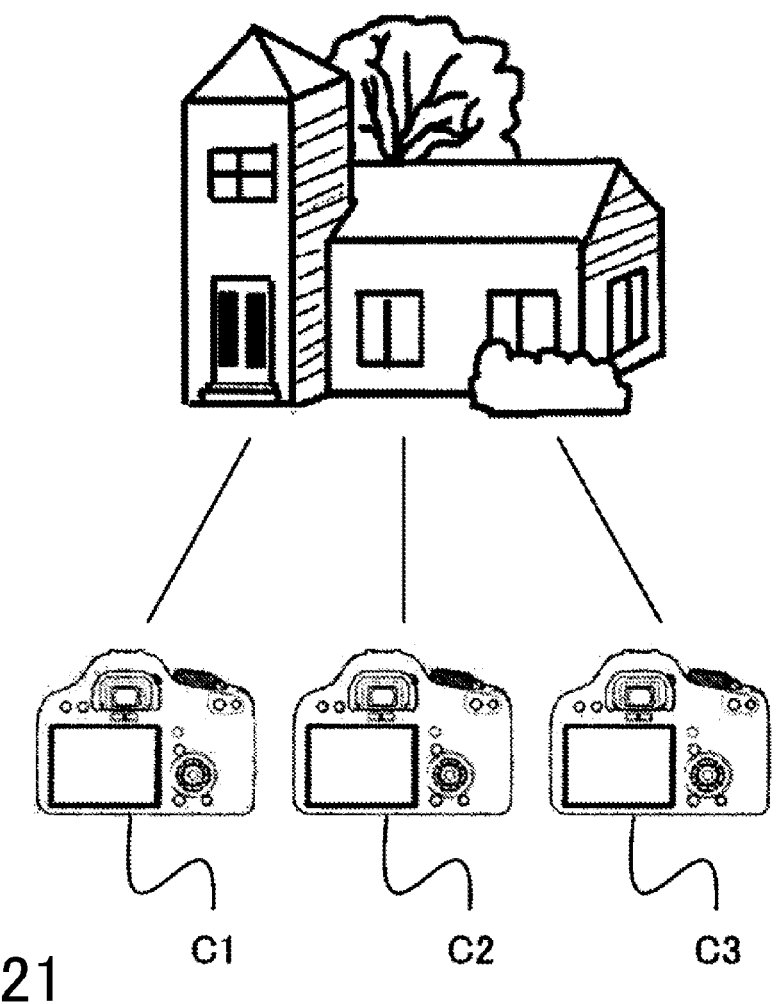
FIG. 21 illustrates an exemplary image pickup apparatus according to Embodiment 4.
Figure 22:
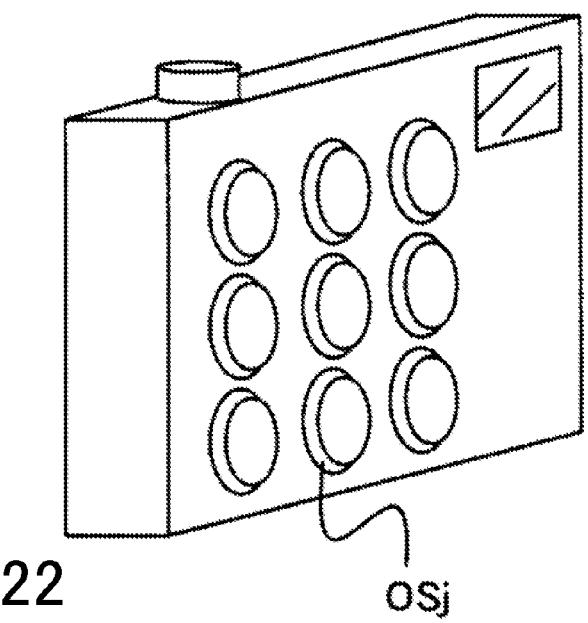
FIG. 22 illustrates an exemplary image pickup apparatus according to Embodiment 4.

In another example, parallax images are obtained by capturing images of an identical object through a plurality of cameras as illustrated in FIG. 21. Thus, these cameras may employ the image processing methods described in Embodiment 1 to 3. C1, C2, and C3 represent separate image pickup apparatuses, but they may be regarded as a single image pickup apparatus that performs image pickup through three divided regions of a large pupil. Alternatively, as illustrated in FIG. 22, the pupil division may be achieved by providing one image pickup apparatus with a plurality of image pickup optical systems OSj (j=1, 2, 3, . . . ).

[Embodiment 5]

Next, Embodiment 5 of the present invention will be described. Although each of the embodiments describes the case of determining or removing unnecessary components over the entire region of an image, unnecessary components are generated only in part of the image as illustrated in FIG. 2 in many cases. Since a region including an unnecessary component in an image can be easily determined by a user, a region of the image where the reduction processing is to be performed is specified by the user, which leads to a reduced processing load in each of the embodiments. Limiting the region where the reduction processing is performed can reduce influence of an object parallax component occurring in the image capturing of a close-range object. Since unnecessary components are treated as one piece of data through synthesizing, adjustment of an unnecessary component removal amount through multiplication with a weight coefficient such as parameter processing can be easily performed.

Figure 23:
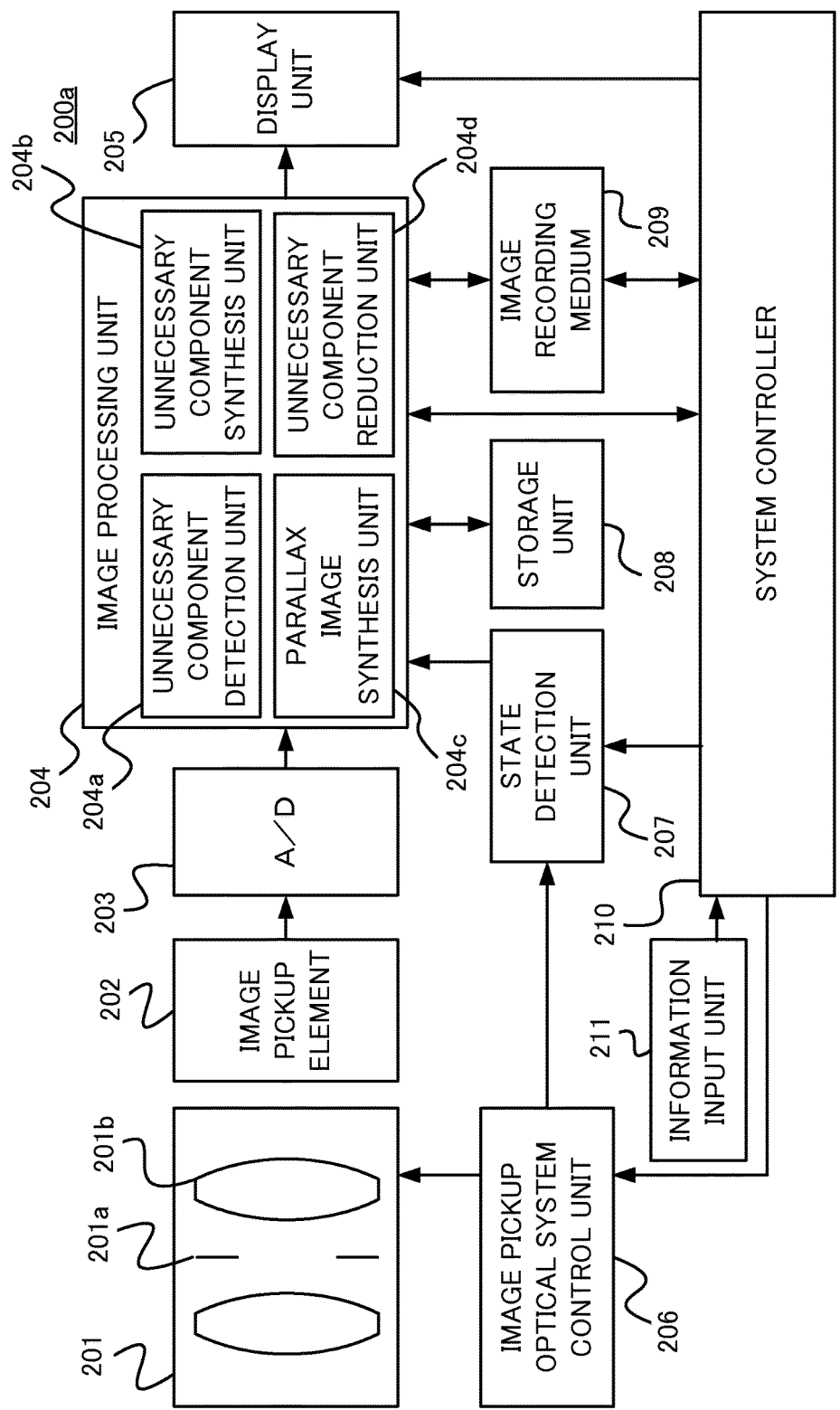
FIG. 23 is a block diagram of an image pickup apparatus according to Embodiment 5.

Referring to FIG. 23, an image pickup apparatus that executes an image processing method in the present embodiment will be described. FIG. 23 is a block diagram of a configuration of an image pickup apparatus 200a in the present embodiment. The image pickup apparatus 200a differs from the image pickup apparatus 200 in Embodiment 1 in that the image pickup apparatus 200a includes an information input unit 211 (input unit). The other configuration is the same as that of the image pickup apparatus 200, and thus a description thereof will be omitted.

The information input unit 211 detects information of a desired image capturing condition (such as an aperture value and an exposure time) selected and input by the user, and supplies the information (data) to the system controller 210. The information input unit 211 detects information of a processing range (image region) selected and input by the user to remove a desired unnecessary component therefrom, and supplies the information (data) to the system controller 210. The information input unit 211 detects information of a desired unnecessary component removal amount selected and input by the user, and supplies the information (data) to the system controller 210.

Figure 24:
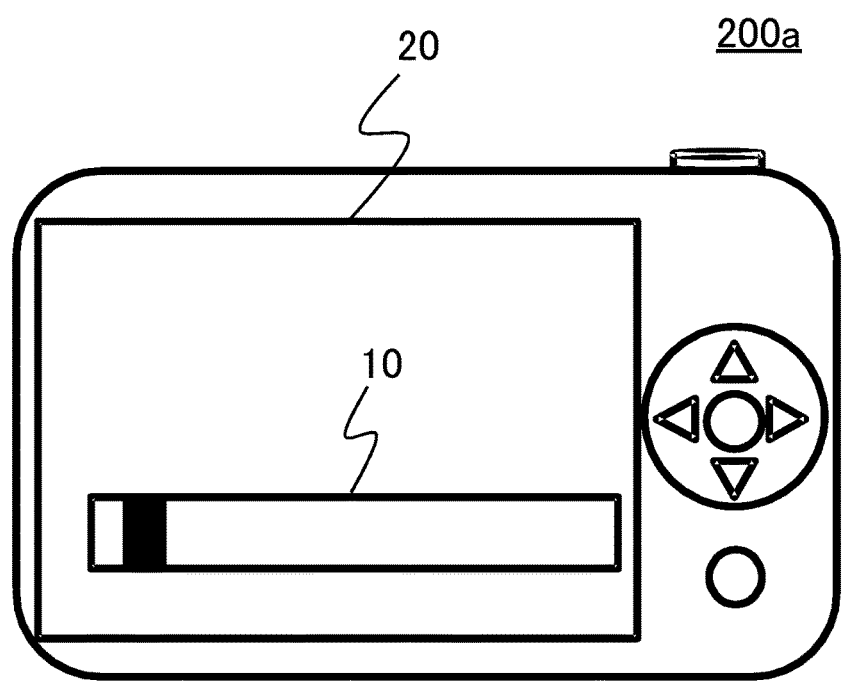
FIG. 24 is a back view of the image pickup apparatus according to Embodiment 5.

Next, referring to FIG. 24, adjustment of unnecessary component removal region and removal amount performed by the image pickup apparatus in the present embodiment will be described. FIG. 24 is a back view of the image pickup apparatus 200a in the present embodiment.

A touch panel 20 is provided to start various function menus such as display of a recorded image size, date and time, custom function, a processing range from which an unnecessary component is to be removed, and an unnecessary component removal amount. The touch panel 20 is provided also to set an item selected from a function menu. The touch panel 20 is provided also to select an item to perform settings of, for example, the recorded image size, the date and time, the custom function, the processing range from which an unnecessary component is to be removed, and the unnecessary component removal amount. In the present embodiment, the touch panel 20 is used as the information input unit 211 in FIG. 23.

The user operates the touch panel 20 to select a processing range (image region) from which a desired unnecessary component is to be removed. Specifically, the user operates the touch panel 20 to select and set a region in a displayed image, for example, a region bordered by solid lines in FIGS. 25A to 25C. The user operates the touch panel 20 to select a removal amount of the desired unnecessary component. Specifically, the user operates the touch panel 20 to select and set a region of an adjustment indicator 10 of the unnecessary component removal amount that is illustrated in FIGS. 24 and 25A to 25C.

Figure 26:
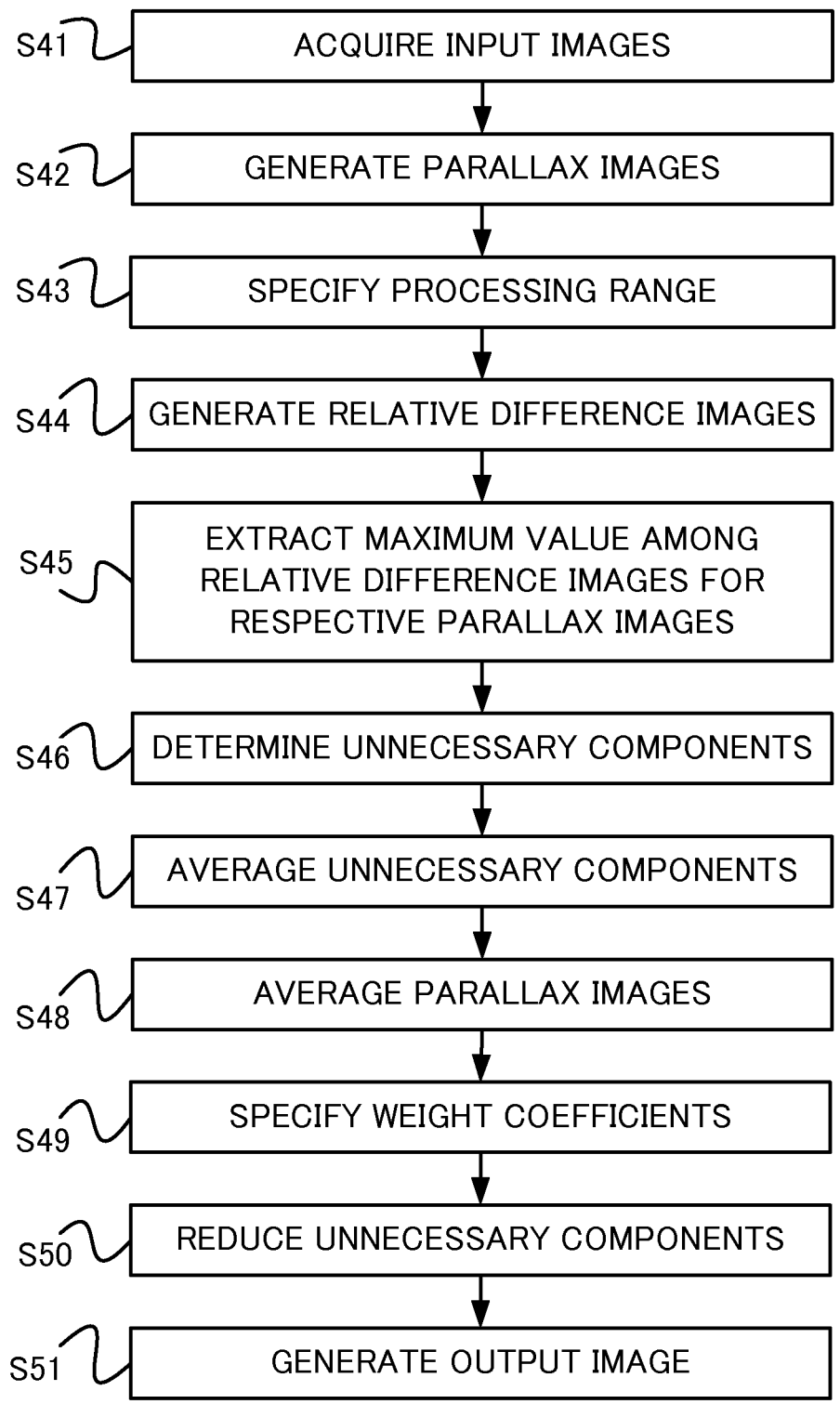
FIG. 26 is a flowchart of an image processing method according to Embodiment 5.

Next, referring to FIG. 26, a procedure of determination processing (image processing) of any unnecessary component (ghost component) in the present embodiment will be described. FIG. 26 illustrates a flowchart of the image processing method (method of determining any unnecessary component) in the present embodiment. Each step in FIG. 26 is executed mainly by the system controller 210 or the image processing unit 204 in accordance with an image processing program as a computer program.

Steps S41 and S42 in FIG. 26 are respectively the same as steps S11 and S12 in FIG. 8 described in Embodiment 1, and thus descriptions thereof will be omitted. Subsequently at step S43, the information input unit 211 specifies a desired processing range (image region) set by the user in which an unnecessary component removal or reduction processing is to be performed. Specifically, a region including an unnecessary component in an output image illustrated in FIG. 25A yet to be provided with the unnecessary component removal processing is specified by the user with the solid line through an operation of the touch panel 20. Steps S44 to S48 are the same as steps S23 to S27 in FIG. 12 described in Embodiment 2 except that the processing at steps S23 to S27 is performed only in the range specified at step S43. Thus, descriptions thereof will be omitted.

Figure 25C:
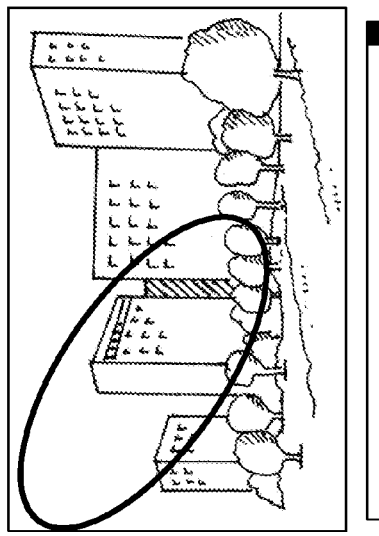
FIGS. 25A to 25C illustrate examples of selecting an unnecessary component reduction processing region and an unnecessary component reduction processing amount according to Embodiment 5.
Figure 25B:
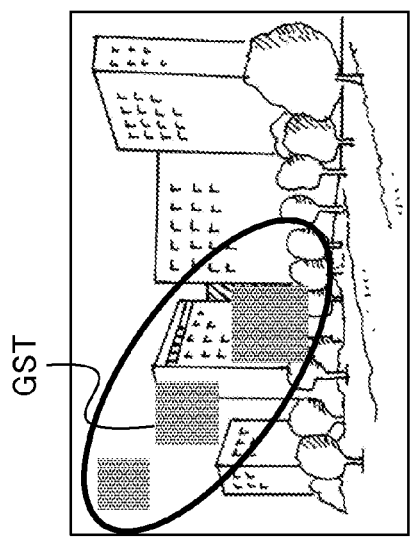
Figure 25A:
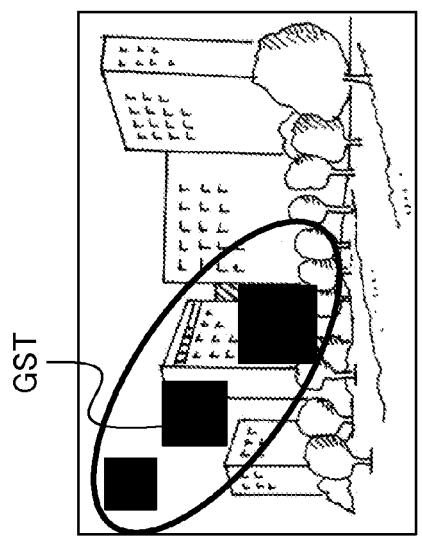

Subsequently at step S49, the information input unit 211 detects and specifies a desired unnecessary component removal amount set by the user. Specifically, the removal amount is specified by the user in the range of the adjustment indicator 10 of the unnecessary component removal amount illustrated in FIGS. 25A to 25C through an operation of the touch panel 20. In the present embodiment, the weight coefficient to multiply the unnecessary component is zero at the left end of the adjustment indicator 10 of the unnecessary component removal amount, and an image yet to be provided with the unnecessary component removal processing, as illustrated in FIG. 25A, is generated. On the other hand, the weight coefficient to multiply the unnecessary component is one at the right end of the adjustment indicator 10 of the unnecessary component removal amount, and an image from which the unnecessary component is completely removed, as illustrated in FIG. 25C, is generated. The weight coefficient to multiply the unnecessary component is between zero and one between the ends of the adjustment indicator 10 of the unnecessary component removal amount, and an image from which a fraction of the unnecessary component corresponding to the weight coefficient is removed, as illustrated in FIG. 25B, is generated. In the present embodiment, the weight coefficient to multiply the unnecessary component is one at maximum, but when a further amount of unnecessary component needs to be removed, the weight coefficient larger than one may be used in the multiplication to execute the removal processing in an amount larger than a detected amount of unnecessary component.

Steps S50 and S51 in FIG. 26 are the same as steps S28 and S29 in FIG. 12 except that the multiplication with the weight coefficient specified at step S49 is performed only in the range specified at step S43. Thus, descriptions thereof will be omitted.

The present embodiment can determine any unnecessary component (ghost component) formed by unnecessary light (ghost) by using a plurality of relative difference images based on a plurality of parallax images obtained through one image pickup. In other words, any unnecessary component included in a shot image can be determined without performing image pickup a plurality of times. Since negative values are discarded when the relative difference images are generated, the present embodiment can obtain a shot image of a high image quality from which the unnecessary component determined only by the simple difference calculation is excellently removed or reduced. The present embodiment calculates a plurality of pieces of relative difference information and calculates relative difference maximum value information as selection of maximum values, thereby effectively detecting and reducing any unnecessary component when the positions of the unnecessary component in a plurality of parallax images overlap with each other. In addition, since the present embodiment synthesizes unnecessary components included in an image obtained by synthesizing parallax images so as to generate the unnecessary components as one piece of data, the unnecessary component reduction processing can be executed by one difference calculation only, and thus can be simplified. Moreover, the adjustment of the unnecessary component removal amount multiplied with weight coefficients such as parameter processing can be easily performed.

Although each of the embodiments describes the case of removing or reducing unnecessary components, correction processing to add another unnecessary component (third unnecessary component) may be performed based on information of determined unnecessary components. For example, a plurality of parallax images illustrated in FIG. 20 include an image with a ghost (unnecessary component) and an image with no ghost. The determined ghost may be added to each parallax image to keep the ghost in a reconstructed image. Alternatively, the ghost may be added to the reconstructed image.

Each of the embodiments describes the image pickup apparatus that employs the image processing method of the present invention (is mounted with the image processing apparatus), but the image processing method of the present invention may be performed by an image processing program installed in a personal computer. In this case, the personal computer corresponds to the image processing apparatus of the present invention. The personal computer takes in (acquires) an image (input image) generated by the image pickup apparatus and yet to be provided with image recovery processing, and outputs an image obtained by performing the image recovery processing by the image processing program.

As described above, the image processing apparatus (image processing unit 204) in each of the embodiments includes the unnecessary component determiner (unnecessary component detection unit 204a), the unnecessary component synthesizer (unnecessary component synthesis unit 204b), and the unnecessary component reducer (unnecessary component reduction unit 204d). The unnecessary component determiner determines the first unnecessary component in each of a plurality of parallax images based on a plurality of pieces of relative difference information of a plurality of parallax images (steps S14, S25, S35, and S46). The unnecessary component synthesizer calculates a synthesis value of the first unnecessary components in the parallax images (steps S15, S26, S36, and S47). The unnecessary component reducer reduces the second unnecessary component included in a synthesis image of the parallax images based on the synthesis value of the first unnecessary components (steps S17, S28, S38, and S50).

The image processing apparatus (or the image pickup apparatus) preferably generates the parallax images through a single image pickup operation (steps S12, S22, S32, and S42). The unnecessary component determiner preferably sets each parallax image as a reference image to obtain each piece of relative difference information by calculating a difference between the reference image and parallax images other than the reference image (steps S13, S23, S33, and S44).

The unnecessary component determiner preferably acquires, as two-dimensional data with any negative value discarded, each piece of relative difference information obtained by using, as a reference image, one of the parallax images that includes any unnecessary component (the first unnecessary component) to be determined. Then, the unnecessary component determiner extracts a maximum value or minimum value among the pieces of relative difference information at each position in the two-dimensional data and determines the position and amount of the first unnecessary component included in the reference image. Alternatively, a predetermined threshold may be used in place of the maximum value or minimum value.

The unnecessary component synthesizer preferably calculates the sum or average value of the first unnecessary components in the parallax images as the synthesis value. The second unnecessary component preferably is the synthesis value of the first unnecessary components. Alternatively, the unnecessary component reduction unit may subtract, from the synthesis image, a value obtained by multiplying the synthesis value of the first unnecessary components with a weight coefficient, to reduce the second unnecessary component.

The image processing apparatus preferably sets an image region including the second unnecessary components to be reduced, in accordance with an operation (specification) by the user through the input unit (information input unit 211) (step S43). Then, the unnecessary component reduction unit reduces the second unnecessary components in the image region thus set. The unnecessary component determiner preferably adjusts the positions of the parallax images. The parallax images are preferably a plurality of images formed by a plurality of light beams passing through regions (pupil regions) of the pupil of the image pickup optical system 201 that are different from each other. The image processing apparatus more preferably adds the third unnecessary component to the synthesis image based on information of the first unnecessary component.

Each of the embodiments can provide an image processing method, an image processing apparatus, an image pickup apparatus, and a non-transitory computer-readable storage medium that are capable of reducing any unnecessary component included in a shot image in a simple and effective manner without performing image pickup a plurality of times (with performing one image pickup). Thus, a shot image having a high image quality can be acquired.

[Other Embodiments]

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086379, filed on Apr. 18, 2014, which is hereby incorporated by reference wherein its entirety.

What is claimed is:

1. An image processing method comprising the steps of:
   determining a plurality of first components, each of the plurality of first components corresponding to light reflected inside an image pickup optical system and included in each of a plurality of parallax images obtained by using the image pickup optical system, based on a plurality of pieces of relative difference information of the plurality of parallax images;
   calculating a synthesis value of the plurality of first components; and
   reducing a second component determined based on the synthesis value from a synthesis image of the plurality of parallax images.

2. The image processing method according to claim 1, further comprising the step of generating the parallax images through a single image pickup operation.

3. The image processing method according to claim 1, further comprising the step of setting each parallax image as a reference image to obtain each piece of relative difference information by calculating a difference between the reference image and a parallax image other than the reference image.

4. The image processing method according to claim 1, wherein the step of determining the plurality of first components includes:
   acquiring, as two-dimensional data with any negative value discarded, each piece of relative difference information obtained by using, as a reference image, one of the parallax images that includes the first component to be determined, and
   extracting a maximum value among the pieces of relative difference information at each position in the two-dimensional data to determine the position and amount of the first component included in the reference image.

5. The image processing method according to claim 1, wherein the step of determining the plurality of first components includes:

acquiring, as two-dimensional data with any negative value discarded, each piece of relative difference information obtained by using, as a reference image, one of the parallax images that includes the first component to be determined, and extracting a minimum value among the pieces of relative difference information at each position in the two-dimensional data to determine the position and amount of the first component included in the reference image.

6. The image processing method according to claim 1, wherein the step of calculating the synthesis value of the plurality of first components includes calculating a sum of the first components as the synthesis value.

7. The image processing method according to claim 1, wherein the step of calculating the synthesis value of the plurality of first components includes calculating an average value of the first components as the synthesis value.

8. The image processing method according to claim 1, further comprising the step of setting an image region including the second component to be reduced, wherein the step of reducing the second component includes reducing the second component included in the set image region.

9. The image processing method according to claim 2, further comprising the step of adjusting positions of the parallax images before obtaining each piece of relative difference information.

10. The image processing method according to claim 1, wherein the parallax images are a plurality of images formed by a plurality of light beams passing through regions of a pupil of the image pickup optical system that are different from each other.

11. The image processing method according to claim 1, further comprising the step of adding a third component to the synthesis image based on information of the first component.

12. An image processing apparatus comprising:
a determiner configured to determine a plurality of first components, each of the plurality of first components corresponding to light reflected inside an image pickup optical system and included in each of a plurality of parallax images obtained by using the image pickup optical system, based on a plurality of pieces of relative difference information of the plurality of parallax images;
a synthesizer configured to calculate a synthesis value of the plurality of first components; and
a reducer configured to reduce a second component determined based on the synthesis value from a synthesis image of the plurality of parallax images.

13. The image processing apparatus according to claim 12, further comprising an image synthesizer configured to generate the synthesis image.

14. An image pickup apparatus comprising:
an image pickup element configured to photoelectrically convert an optical image to output a plurality of parallax images;
a determiner configured to determine a plurality of first components, each of the plurality of first components corresponding to light reflected inside an image pickup optical system and included in each of the plurality of parallax images obtained by using the image pickup optical system, based on a plurality of pieces of relative difference information of the plurality of parallax images;
a synthesizer configured to calculate a synthesis value of the plurality of first components; and
a reducer configured to reduce a second component determined based on the synthesis value from a synthesis image of the plurality of parallax images.

15. The image pickup apparatus according to claim 14, wherein:
the plurality of parallax images is a plurality of images formed by a plurality of light beams passing through regions of a pupil of the image pickup optical system that are different from each other,
the image pickup element includes a plurality of pixels that share one micro lens, and
the pixels receive the light beams passing through the regions of the pupil that are different from each other.

16. The image pickup apparatus according to claim 14, further comprising an input unit through which an image region including the second component to be reduced is specified, wherein the reducer reduces, from the synthesis image of the parallax images, the second component included in the image region specified through the input unit.

17. A non-transitory computer-readable storage medium that stores an image processing program configured to cause a computer to execute the steps of:
determining a plurality of first components, each of the plurality of first components corresponding to light reflected inside an image pickup optical system and included in each of a plurality of parallax images obtained by using the image pickup optical system, based on a plurality of pieces of relative difference information of the plurality of parallax images;
calculating a synthesis value of the plurality of first components; and
reducing a second component determined based on the synthesis value from a synthesis image of the plurality of parallax images.

18. The image processing method according to claim 1, wherein the second component is determined by multiplying synthesis value components with a weight coefficient.

* * * * *